United States Patent
Dahlberg

(10) Patent No.: US 10,749,893 B1
(45) Date of Patent: Aug. 18, 2020

(54) SYSTEMS AND METHODS FOR INFERRING ENTITY RELATIONSHIPS VIA NETWORK COMMUNICATIONS OF USERS OR USER DEVICES

(71) Applicant: BitSight Technologies, Inc., Boston, MA (US)

(72) Inventor: Daniel Dahlberg, Somerville, MA (US)

(73) Assignee: BitSight Technologies, Inc., Boston, MA (US)

( * ) Notice: Subject to any disclaimer, the term of this patent is extended or adjusted under 35 U.S.C. 154(b) by 0 days.

(21) Appl. No.: 16/787,650

(22) Filed: Feb. 11, 2020

Related U.S. Application Data

(63) Continuation of application No. 16/549,764, filed on Aug. 23, 2019.

(51) Int. Cl.
| | |
|---|---|
| *H04L 29/06* | (2006.01) |
| *H04L 29/12* | (2006.01) |
| *H04W 8/00* | (2009.01) |
| *G06N 5/04* | (2006.01) |
| *G06F 16/28* | (2019.01) |
| *G06Q 10/06* | (2012.01) |

(52) U.S. Cl.
CPC ........ *H04L 63/1433* (2013.01); *G06F 16/288* (2019.01); *G06N 5/04* (2013.01); *G06Q 10/067* (2013.01); *H04L 61/1588* (2013.01); *H04W 8/005* (2013.01); *H04L 61/609* (2013.01)

(58) Field of Classification Search
None
See application file for complete search history.

(56) References Cited

U.S. PATENT DOCUMENTS

| | | |
|---|---|---|
| 5,867,799 A | 2/1999 | Lang et al. |
| 6,016,475 A | 1/2000 | Miller et al. |
| 6,792,401 B1 | 9/2004 | Nigro et al. |
| 7,062,572 B1 | 6/2006 | Hampton |
| D525,264 S | 7/2006 | Chotai et al. |
| D525,629 S | 7/2006 | Chotai et al. |
| 7,100,195 B1 | 8/2006 | Underwood |
| 7,194,769 B2 | 3/2007 | Lippmann et al. |
| 7,290,275 B2 | 10/2007 | Baudoin et al. |
| D604,740 S | 11/2009 | Matheny et al. |
| 7,650,570 B2 | 1/2010 | Torrens et al. |
| 7,747,778 B1 | 6/2010 | King et al. |
| 7,748,038 B2 | 6/2010 | Olivier et al. |

(Continued)

FOREIGN PATENT DOCUMENTS

| | | |
|---|---|---|
| WO | WO-2017/142694 A1 | 8/2017 |
| WO | WO-2019/023045 A1 | 1/2019 |

OTHER PUBLICATIONS

U.S. Appl. No. 15/271,655, Published as: US2018/0083999, Self-Published Security Risk Management, filed Sep. 21, 2016.

(Continued)

*Primary Examiner* — Fatoumata Traore
(74) *Attorney, Agent, or Firm* — Goodwin Procter LLP

(57) ABSTRACT

A number of techniques facilitate generation of data points from observations about network traffic. An inferencing system can use these data points to determine whether a relationship exists between two entities or whether an existing relationship has terminated, without any external knowledge of the existence of or termination of such a relationship.

25 Claims, 13 Drawing Sheets

(56) References Cited

U.S. PATENT DOCUMENTS

| | | |
|---|---|---|
| 7,827,607 B2 | 11/2010 | Sobel et al. |
| D630,645 S | 1/2011 | Tokunaga et al. |
| 7,971,252 B2 | 6/2011 | Lippmann et al. |
| D652,048 S | 1/2012 | Joseph |
| D667,022 S | 9/2012 | LoBosco et al. |
| 8,370,933 B1 | 2/2013 | Buckler |
| 8,429,630 B2 | 4/2013 | Nickolov et al. |
| D682,287 S | 5/2013 | Cong et al. |
| D688,260 S | 8/2013 | Pearcy et al. |
| 8,504,556 B1 | 8/2013 | Rice et al. |
| D691,164 S | 10/2013 | Lim et al. |
| D694,252 S | 11/2013 | Helm |
| D694,253 S | 11/2013 | Helm |
| 8,621,621 B1 | 12/2013 | Burns et al. |
| 8,661,146 B2 | 2/2014 | Alex et al. |
| D700,616 S | 3/2014 | Chao |
| 8,677,481 B1 | 3/2014 | Lee |
| 8,825,662 B1 | 9/2014 | Kingman et al. |
| D730,918 S | 6/2015 | Park et al. |
| 9,053,210 B2 | 6/2015 | Elnikety et al. |
| D740,847 S | 10/2015 | Yampolskiy et al. |
| D740,848 S | 10/2015 | Bolts et al. |
| D741,351 S | 10/2015 | Kito et al. |
| D746,832 S | 1/2016 | Pearcy et al. |
| 9,241,252 B2 | 1/2016 | Dua et al. |
| 9,244,899 B1 | 1/2016 | Greenbaum |
| 9,294,498 B1 | 3/2016 | Yampolskiy et al. |
| D754,690 S | 4/2016 | Park et al. |
| D754,696 S | 4/2016 | Follett et al. |
| D756,371 S | 5/2016 | Bertnick et al. |
| D756,372 S | 5/2016 | Bertnick et al. |
| D756,392 S | 5/2016 | Yun et al. |
| D759,084 S | 6/2016 | Yampolskiy et al. |
| D759,689 S | 6/2016 | Olson et al. |
| 9,372,994 B1 | 6/2016 | Yampolskiy et al. |
| D760,782 S | 7/2016 | Kendler et al. |
| 9,384,206 B1 | 7/2016 | Bono et al. |
| 9,407,658 B1 | 8/2016 | Kuskov et al. |
| 9,424,333 B1 | 8/2016 | Bisignani et al. |
| D771,695 S | 11/2016 | Yampolskiy et al. |
| D772,276 S | 11/2016 | Yampolskiy et al. |
| 9,501,647 B2 | 11/2016 | Yampolskiy et al. |
| D773,507 S | 12/2016 | Sagrillo et al. |
| D775,635 S | 1/2017 | Raji et al. |
| D776,136 S | 1/2017 | Chen et al. |
| D776,153 S | 1/2017 | Yampolskiy et al. |
| D777,177 S | 1/2017 | Chen et al. |
| 9,560,072 B1 | 1/2017 | Xu |
| D778,927 S | 2/2017 | Bertnick et al. |
| D778,928 S | 2/2017 | Bertnick et al. |
| D779,512 S | 2/2017 | Kimura et al. |
| D779,514 S | 2/2017 | Baris et al. |
| D779,531 S | 2/2017 | List et al. |
| D780,770 S | 3/2017 | Sum et al. |
| D785,009 S | 4/2017 | Lim et al. |
| D785,010 S | 4/2017 | Bachman et al. |
| D785,016 S | 4/2017 | Berwick et al. |
| 9,620,079 B2 | 4/2017 | Curtis |
| D787,530 S | 5/2017 | Huang |
| D788,128 S | 5/2017 | Wada |
| 9,641,547 B2 | 5/2017 | Yampolskiy et al. |
| 9,646,110 B2 | 5/2017 | Byrne et al. |
| D789,947 S | 6/2017 | Sun |
| D789,957 S | 6/2017 | Wu et al. |
| D791,153 S | 7/2017 | Rice et al. |
| D791,834 S | 7/2017 | Eze et al. |
| D792,427 S | 7/2017 | Weaver et al. |
| D795,891 S | 8/2017 | Kohan et al. |
| D796,523 S | 9/2017 | Bhandari et al. |
| D801,989 S | 11/2017 | Iketsuki et al. |
| D803,237 S | 11/2017 | Wu et al. |
| D804,528 S | 12/2017 | Martin et al. |
| D806,735 S | 1/2018 | Olsen et al. |
| D806,737 S | 1/2018 | Chung et al. |
| D809,523 S | 2/2018 | Lipka et al. |
| D812,633 S | 3/2018 | Saneii |
| D814,483 S | 4/2018 | Gavaskar et al. |
| D815,119 S | 4/2018 | Chalker et al. |
| D815,148 S | 4/2018 | Martin et al. |
| D816,105 S | 4/2018 | Rudick et al. |
| D816,116 S | 4/2018 | Selassie |
| 9,954,893 B1 | 4/2018 | Zhao et al. |
| D817,970 S | 5/2018 | Chang et al. |
| D817,977 S | 5/2018 | Kato et al. |
| D819,687 S | 6/2018 | Yampolskiy et al. |
| 10,044,750 B2 | 8/2018 | Livshits et al. |
| 10,079,854 B1 | 9/2018 | Scott et al. |
| 10,142,364 B2 | 11/2018 | Baukes et al. |
| 10,185,924 B1 | 1/2019 | McClintock et al. |
| 10,217,071 B2 | 2/2019 | Mo et al. |
| 10,230,753 B2 | 3/2019 | Yampolskiy et al. |
| 10,230,764 B2 | 3/2019 | Ng et al. |
| 10,235,524 B2 | 3/2019 | Ford |
| 10,257,219 B1 * | 4/2019 | Geil .................. G06F 21/577 |
| 10,305,854 B2 | 5/2019 | Alizadeh-Shabdiz et al. |
| 10,339,321 B2 | 7/2019 | Tedeschi |
| 10,339,484 B2 | 7/2019 | Pai et al. |
| 10,412,083 B2 | 9/2019 | Zou et al. |
| 10,469,515 B2 | 11/2019 | Helmsen et al. |
| 10,491,619 B2 | 11/2019 | Yampolskiy et al. |
| 10,491,620 B2 | 11/2019 | Yampolskiy et al. |
| 10,521,583 B1 * | 12/2019 | Bagulho Monteiro Pereira .......... G06F 21/53 |
| 2001/0044798 A1 | 11/2001 | Nagral et al. |
| 2002/0083077 A1 | 6/2002 | Vardi |
| 2002/0133365 A1 | 9/2002 | Grey et al. |
| 2002/0164983 A1 | 11/2002 | Raviv et al. |
| 2003/0050862 A1 | 3/2003 | Bleicken et al. |
| 2003/0123424 A1 | 7/2003 | Jung |
| 2003/0187967 A1 | 10/2003 | Walsh et al. |
| 2004/0003284 A1 | 1/2004 | Campbell et al. |
| 2004/0010709 A1 | 1/2004 | Baudoin et al. |
| 2004/0024859 A1 | 2/2004 | Bloch et al. |
| 2004/0098375 A1 | 5/2004 | DeCarlo |
| 2004/0133561 A1 | 7/2004 | Burke |
| 2004/0193907 A1 | 9/2004 | Patanella |
| 2004/0193918 A1 | 9/2004 | Green et al. |
| 2004/0199791 A1 | 10/2004 | Poletto et al. |
| 2004/0199792 A1 | 10/2004 | Tan et al. |
| 2004/0221296 A1 | 11/2004 | Ogielski et al. |
| 2004/0250122 A1 | 12/2004 | Newton |
| 2004/0250134 A1 | 12/2004 | Kohler et al. |
| 2005/0071450 A1 | 3/2005 | Allen et al. |
| 2005/0076245 A1 | 4/2005 | Graham et al. |
| 2005/0080720 A1 | 4/2005 | Betz et al. |
| 2005/0108415 A1 | 5/2005 | Turk et al. |
| 2005/0131830 A1 | 6/2005 | Juarez et al. |
| 2005/0138413 A1 | 6/2005 | Lippmann et al. |
| 2005/0160002 A1 | 7/2005 | Roetter et al. |
| 2005/0278726 A1 | 12/2005 | Cano et al. |
| 2006/0036335 A1 | 2/2006 | Banter et al. |
| 2006/0107226 A1 | 5/2006 | Matthews et al. |
| 2006/0173992 A1 | 8/2006 | Weber et al. |
| 2006/0212925 A1 | 9/2006 | Shull et al. |
| 2006/0253581 A1 | 11/2006 | Dixon et al. |
| 2007/0067845 A1 | 3/2007 | Wiemer et al. |
| 2007/0143851 A1 | 6/2007 | Nicodemus et al. |
| 2007/0198275 A1 | 8/2007 | Malden et al. |
| 2007/0282730 A1 | 12/2007 | Carpenter et al. |
| 2008/0033775 A1 | 2/2008 | Dawson et al. |
| 2008/0047018 A1 | 2/2008 | Baudoin et al. |
| 2008/0091834 A1 | 4/2008 | Norton |
| 2008/0140495 A1 | 6/2008 | Bhamidipaty et al. |
| 2008/0162931 A1 | 7/2008 | Lord et al. |
| 2008/0172382 A1 | 7/2008 | Prettejohn |
| 2008/0208995 A1 | 8/2008 | Takahashi et al. |
| 2008/0209565 A2 | 8/2008 | Baudoin et al. |
| 2008/0222287 A1 | 9/2008 | Bahl et al. |
| 2008/0262895 A1 | 10/2008 | Hofmeister et al. |
| 2009/0044272 A1 | 2/2009 | Jarrett |
| 2009/0094265 A1 | 4/2009 | Vlachos et al. |
| 2009/0125427 A1 | 5/2009 | Atwood et al. |
| 2009/0132861 A1 | 5/2009 | Costa et al. |
| 2009/0161629 A1 | 6/2009 | Purkayastha et al. |

(56) References Cited

U.S. PATENT DOCUMENTS

| | | |
|---|---|---|
| 2009/0193054 A1 | 7/2009 | Karimisetty et al. |
| 2009/0216700 A1 | 8/2009 | Bouchard et al. |
| 2009/0265787 A9 | 10/2009 | Baudoin et al. |
| 2009/0293128 A1 | 11/2009 | Lippmann et al. |
| 2009/0299802 A1 | 12/2009 | Brennan |
| 2009/0300768 A1 | 12/2009 | Krishnamurthy et al. |
| 2009/0319420 A1 | 12/2009 | Sanchez et al. |
| 2009/0328063 A1 | 12/2009 | Corvera et al. |
| 2010/0017880 A1 | 1/2010 | Masood |
| 2010/0042605 A1 | 2/2010 | Cheng et al. |
| 2010/0057582 A1 | 3/2010 | Arfin et al. |
| 2010/0186088 A1 | 7/2010 | Banerjee et al. |
| 2010/0205042 A1 | 8/2010 | Mun |
| 2010/0218256 A1 | 8/2010 | Thomas et al. |
| 2010/0262444 A1 | 10/2010 | Atwal et al. |
| 2010/0275263 A1 | 10/2010 | Bennett et al. |
| 2010/0281124 A1 | 11/2010 | Westman et al. |
| 2010/0281151 A1 | 11/2010 | Ramankutty et al. |
| 2011/0137704 A1 | 6/2011 | Mitra et al. |
| 2011/0145576 A1 | 6/2011 | Bettan |
| 2011/0185403 A1 | 7/2011 | Dolan et al. |
| 2011/0213742 A1 | 9/2011 | Lemmond et al. |
| 2011/0231395 A1 | 9/2011 | Vadlamani et al. |
| 2011/0239300 A1 | 9/2011 | Klein et al. |
| 2011/0296519 A1 | 12/2011 | Ide et al. |
| 2012/0036263 A1 | 2/2012 | Madden et al. |
| 2012/0089745 A1 | 4/2012 | Turakhia |
| 2012/0158725 A1 | 6/2012 | Molloy et al. |
| 2012/0166458 A1 | 6/2012 | Laudanski et al. |
| 2012/0215892 A1 | 8/2012 | Wanser et al. |
| 2012/0255027 A1 | 10/2012 | Kanakapura et al. |
| 2012/0291129 A1 | 11/2012 | Shulman et al. |
| 2013/0014253 A1 | 1/2013 | Neou et al. |
| 2013/0060351 A1 | 3/2013 | Imming et al. |
| 2013/0080505 A1 | 3/2013 | Nielsen et al. |
| 2013/0086521 A1 | 4/2013 | Grossele et al. |
| 2013/0091574 A1 | 4/2013 | Howes et al. |
| 2013/0124644 A1 | 5/2013 | Hunt et al. |
| 2013/0124653 A1 | 5/2013 | Vick et al. |
| 2013/0142050 A1 | 6/2013 | Luna |
| 2013/0173791 A1 | 7/2013 | Longo |
| 2013/0291105 A1 | 10/2013 | Yan |
| 2013/0298244 A1 | 11/2013 | Kumar et al. |
| 2013/0305368 A1 | 11/2013 | Ford |
| 2013/0333038 A1 | 12/2013 | Chien |
| 2013/0347116 A1 | 12/2013 | Flores et al. |
| 2014/0006129 A1 | 1/2014 | Heath |
| 2014/0019196 A1 | 1/2014 | Wiggins et al. |
| 2014/0108474 A1 | 4/2014 | David et al. |
| 2014/0114843 A1 | 4/2014 | Klein et al. |
| 2014/0130158 A1 | 5/2014 | Wang et al. |
| 2014/0146370 A1 | 5/2014 | Banner et al. |
| 2014/0189098 A1 | 7/2014 | MaGill et al. |
| 2014/0204803 A1 | 7/2014 | Nguyen et al. |
| 2014/0244317 A1 | 8/2014 | Roberts et al. |
| 2014/0283068 A1 | 9/2014 | Call et al. |
| 2014/0288996 A1 | 9/2014 | Rence et al. |
| 2014/0304816 A1 | 10/2014 | Klein et al. |
| 2014/0337633 A1 | 11/2014 | Yang et al. |
| 2015/0033341 A1 | 1/2015 | Schmidtler et al. |
| 2015/0074579 A1 | 3/2015 | Gladstone et al. |
| 2015/0081860 A1 | 3/2015 | Kuehnel et al. |
| 2015/0180883 A1 | 6/2015 | Aktas et al. |
| 2015/0261955 A1 | 9/2015 | Huang et al. |
| 2015/0288706 A1 | 10/2015 | Marshall |
| 2015/0288709 A1 | 10/2015 | Singhal et al. |
| 2015/0310188 A1 | 10/2015 | Ford et al. |
| 2015/0310213 A1 | 10/2015 | Ronen et al. |
| 2015/0347756 A1 | 12/2015 | Hidayat et al. |
| 2015/0350229 A1 | 12/2015 | Mitchell |
| 2015/0381649 A1 | 12/2015 | Schultz et al. |
| 2016/0065613 A1 | 3/2016 | Cho et al. |
| 2016/0140466 A1 | 5/2016 | Sidebottom et al. |
| 2016/0147992 A1 | 5/2016 | Zhao et al. |
| 2016/0162602 A1 | 6/2016 | Bradish et al. |
| 2016/0171415 A1 | 6/2016 | Yampolskiy et al. |
| 2016/0173522 A1 | 6/2016 | Yampolskiy et al. |
| 2016/0189301 A1 | 6/2016 | Ng et al. |
| 2016/0205126 A1 | 7/2016 | Boyer et al. |
| 2016/0248797 A1 | 8/2016 | Yampolskiy et al. |
| 2016/0253500 A1 | 9/2016 | Alme et al. |
| 2016/0259945 A1 | 9/2016 | Yampolskiy et al. |
| 2016/0337387 A1 | 11/2016 | Hu et al. |
| 2016/0344801 A1 | 11/2016 | Akkarawittayapoom |
| 2017/0048267 A1 | 2/2017 | Yampolskiy et al. |
| 2017/0063901 A1 | 3/2017 | Muddu et al. |
| 2017/0161409 A1 | 6/2017 | Martin |
| 2017/0236078 A1 | 8/2017 | Rasumov |
| 2017/0237764 A1 | 8/2017 | Rasumov |
| 2017/0279843 A1 | 9/2017 | Schultz et al. |
| 2017/0316324 A1 | 11/2017 | Barrett et al. |
| 2017/0324766 A1 | 11/2017 | Gonzalez Granadillo et al. |
| 2017/0337487 A1 | 11/2017 | Nock et al. |
| 2018/0013716 A1 | 1/2018 | Connell et al. |
| 2018/0103043 A1 | 4/2018 | Kupreev et al. |
| 2018/0124110 A1 | 5/2018 | Hunt et al. |
| 2018/0139180 A1 | 5/2018 | Napchi et al. |
| 2018/0157468 A1 | 6/2018 | Stachura |
| 2018/0336348 A1 | 11/2018 | Ng et al. |
| 2018/0337938 A1 | 11/2018 | Kneib et al. |
| 2018/0337941 A1 | 11/2018 | Kraning et al. |
| 2018/0365519 A1 | 12/2018 | Pollard et al. |
| 2018/0375896 A1 | 12/2018 | Wang et al. |
| 2019/0034845 A1 | 1/2019 | Mo et al. |
| 2019/0140925 A1 | 5/2019 | Pon et al. |
| 2019/0147378 A1 | 5/2019 | Mo et al. |
| 2019/0379632 A1 | 12/2019 | Dahlberg et al. |
| 2019/0392252 A1 | 12/2019 | Fighel et al. |

OTHER PUBLICATIONS

U.S. Appl. No. 15/377,574, U.S. Pat. No. 9,705,932, Methods and Systems for Creating, De-Duplicating, and Accessing Data Using an Object Storage System, filed Dec. 13, 2016.
U.S. Appl. No. 14/021,585, U.S. Pat. No. 9,438,615, Published as: US2015/0074579, Security Risk Management, filed Sep. 9, 2013.
U.S. Appl. No. 15/216,955, U.S. Pat. No. 10,326,786, Published as: US2016/0330231, Methods for Using Organizational Behavior for Risk Ratings, filed Jul. 22, 2016.
U.S. Appl. No. 15/239,063, U.S. Pat. No. 10,341,370, Published as: US2017/0093901, Security Risk Management, filed Aug. 17, 2016.
U.S. Appl. No. 16/405,121, Published as: US2019/0260791, Methods for Using Organizational Behavior for Risk Ratings, filed May 7, 2019.
U.S. Appl. No. 13/240,572, Published as: US2016/0205126, Information Technology Security Assessment System, filed Sep. 22, 2011.
U.S. Appl. No. 14/944,484, U.S. Pat. No. 9,973,524, Published as: US2016/0323308, Information Technology Security Assessment System, filed Nov. 18, 2015.
U.S. Appl. No. 15/142,677, U.S. Pat. No. 9,830,569, Published as: US2016/0239772, Security Assessment Using Service Provider Digital Asset Information, filed Apr. 29, 2016.
U.S. Appl. No. 15/134,845, U.S. Pat. No. 9,680,858, Annotation Platform for a Security Risk System, filed Apr. 21, 2016.
U.S. Appl. No. 15/044,952, Published as: US2017/0236077, Relationships Among Technology Assets and Services and the Entities Responsible For Them, filed Feb. 16, 2016.
U.S. Appl. No. 15/089,207, Relationships Among Technology Assets and Services and the Entities Responsible for Them, filed Apr. 1, 2016.
U.S. Appl. No. 15/089,375, U.S. Pat. No. 10,176,445, Published as: US2017/0236079, Relationships Among Technology Assets and Services and the Entities Responsible for Them, filed Apr. 1, 2016.
U.S. Appl. No. 29/598,298, D835,631, Computer Display Screen With Graphical User Interface, filed Mar. 24, 2017.
U.S. Appl. No. 29/598,299, D818,475, Computer Display With Security Ratings Graphical User Interface, filed Mar. 24, 2017.
U.S. Appl. No. 29/599,622, D847,169, Computer Display With Security Ratings Graphical User Interface, filed Apr. 5, 2017.

(56) References Cited

OTHER PUBLICATIONS

U.S. Appl. No. 29/599,620, D846,562, Computer Display With Security Ratings Graphical User Interface, filed Apr. 5, 2017.
U.S. Appl. No. 16/015,686, U.S. Pat. No. 10,425,380, Published as: US2018/0375822, Methods For Mapping IP Addresses and Domains to Organizations Using Activity Data, filed Jun. 22, 2018.
U.S. Appl. No. 16/543,075, Published as: US2019/0379632, Methods for Mapping IP Addresses and Domains to Organizations Using User Activity Data, filed Aug. 16, 2019.
U.S. Appl. No. 16/738,825, Methods for Mapping IP Addresses and Domains to Organizations Using User Activity Data, filed Jan. 9, 2020.
U.S. Appl. No. 15/918,286, U.S. Pat. No. 10,257,219, Correlated Risk in Cybersecurity, filed Mar. 12, 2018.
U.S. Appl. No. 16/292,956, Published as: US2019/0297106, Correlated Risk in Cybersecurity, filed Mar. 5, 2019.
U.S. Appl. No. 16/170,680, U.S. Pat. No. 10,521,583, Systems and Methods for Remote Detection of Software Through Browser Webinjects, filed Oct. 25, 2018.
U.S. Appl. No. 16/688,647, Systems and Methods for Remote Detection of Software Through Browser Webinjects, filed Nov. 19, 2019.
U.S. Appl. No. 15/954,921, Published as: US2019/0319979, Systems and Methods for External Detection of Misconfigured Systems, filed Apr. 17, 2018.
U.S. Appl. No. 16/549,764, Systems and Methods for Inferring Entity Relationships Via Network Communications of Users or User Devices, filed Aug. 23, 2019.
U.S. Appl. No. 16/583,991, Systems and Methods for Network Asset Discovery and Association Thereof With Entities, filed Sep. 26, 2019.
U.S. Appl. No. 29/666,942, Computer Display With Forecast Graphical User Interface, filed Oct. 17, 2018.
U.S. Appl. No. 16/360,641, Systems and Methods for Forecasting Cybersecurity Ratings Based on Event-Rate Scenarios, filed Mar. 21, 2019.
U.S. Appl. No. 16/514,771, Systems and Methods for Generating Security Improvement Plans for Entities, filed Jul. 17, 2019.
U.S. Appl. No. 29/677,306, Computer Display With Corporate Hierarchy Graphical User Interface, filed Jan. 18, 2019.
U.S. Appl. No. 16/775,840, Systems and Methods for Assessing Cybersecurity State of Entities Based on Computer Network Characterization, filed Jan. 29, 2020.
U.S. Appl. No. 16/779,437, Systems and Methods for Rapidly Generating Security Ratings, filed Jan. 31, 2020.
U.S. Appl. No. 16/802,232, Systems and Methods for Improving a Security Profile of an Entity Based on Peer Entity, filed Feb. 26, 2020.
U.S. Appl. No. 29/725,724, Computer Display With Risk Vectors Graphical User Interface, filed Feb. 26, 2020.
U.S. Appl. No. 15/271,655, the Office Action dated Feb. 21, 2017 and dated Aug. 18, 2017.
U.S. Appl. No. 15/377,574, now U.S. Pat. No. 9,705,932, the Office Action dated Mar. 2, 2017 and the Notice of Allowance dated Jun. 1, 2017.
U.S. Appl. No. 14/021,585, now U.S. Pat. No. 9,438,615, the Office Action dated Mar. 11, 2016 and the Notice of Allowance dated Jul. 11, 2016 and Aug. 9, 2016.
U.S. Appl. No. 15/216,955, now U.S. Pat. No. 10,326,786, the Office Action dated Nov. 4, 2016, Mar. 9, 2017, Jun. 6, 2017, Dec. 5, 2017, and Aug. 29, 2018, and the Notice of Allowance dated Feb. 6, 2019.
U.S. Appl. No. 15/239,063, now U.S. Pat. No. 10,341,370, the Office Action dated Mar. 21, 2018 and the Notice of Allowance dated Jan. 14, 2019.
U.S. Appl. No. 16/405,121, the Office Action dated Aug. 1, 2019 and dated Nov. 21, 2019.
U.S. Appl. No. 13/240,572, the Office Actions dated May 7, 2013, Nov. 21, 2013, Jun. 16, 2014, Feb. 27, 2016, Jun. 3, 2015, Oct. 26, 2015, Mar. 10, 2016, Feb. 13, 2017, Examiner's Answer to Appeal Brief dated May 16, 2018; and Patent Board Decision-Examiner Reversed Mar. 16, 2020.
U.S. Appl. No. 14/944,484, now U.S. Pat. No. 9,973,524, the Office Actions dated Mar. 11, 2016, Jul. 5, 2016, and Jan. 17, 2017; and the Notice of Allowance dated Oct. 20, 2017.
U.S. Appl. No. 15/142,677, now U.S. Pat. No. 9,830,569, the Office Actions dated Jul. 26, 2016, and Apr. 24, 2017 and the Notice of Allowance dated Oct. 11, 2017.
U.S. Appl. No. 15/134,845, now U.S. Pat. No. 9,680,858, the Office Actions dated Jul. 19, 2016 and Jan. 26, 2017, and the Notices of Allowance dated Apr. 27, 2017 and May 9, 2017.
U.S. Appl. No. 15/044,952, the Office Actions dated Jul. 8, 2019 and Feb. 21, 2020.
U.S. Appl. No. 15/089,207, the Office Action dated Jan. 12, 2017.
U.S. Appl. No. 15/089,375, now U.S. Pat. No. 10,176,445, the Office Actions dated Sep. 9, 2016, May 17, 2017, and Nov. 17, 2017 and the Notices of Allowance dated Aug. 9, 2018; Nov. 14, 2018 Nov. 26, 2018, Dec. 12, 2018.
U.S. Appl. No. 29/598,298, now U.S. Pat. No. D835,631, the Notice of Allowance dated Aug. 15, 2018.
U.S. Appl. No. 29/598,299, now U.S. Pat. No. D818,475, the Notice of Allowance dated Jan. 2, 2018.
U.S. Appl. No. 29/599,622, now U.S. Pat. No. D847,169, the Notice of Allowance dated Dec. 11, 2018.
U.S. Appl. No. 29/599,620, now U.S. Pat. No. D846,562, the Office Action dated May 3, 2018, the Notice of Allowance dated Nov. 27, 2018.
U.S. Appl. No. 16/015,686, now U.S. Pat. No. 10,425,380, the Office Action dated Nov. 16, 2018 and the Notice of Allowance dated May 10, 2019.
U.S. Appl. No. 16/543,075, the Notice of Allowance dated Sep. 25, 2019.
U.S. Appl. No. 15/918,286, now U.S. Pat. No. 10,257,219, the Office Action dated Aug. 7, 2018 and the Notice of Allowance dated Nov. 29, 2018.
U.S. Appl. No. 16/292,956, the Office Action dated Jul. 10, 2019 and the Notice of Allowance dated Oct. 31, 2019 and Jan. 8, 2020.
U.S. Appl. No. 16/170,680, now U.S. Pat. No. 10,521,583, the Office Action dated Mar. 26, 2019 and the Notices of Allowance dated Aug. 27, 2019 and Oct. 29, 2019.
U.S. Appl. No. 16/688,647, the Office Action dated Jan. 29, 2020.
U.S. Appl. No. 15/954,921, the Office Actions dated Sep. 4, 2018, Dec. 5, 2019, Jan. 3, 2019, Aug. 19, 2019, and Dec. 5, 2019; and Advisory Action dated Mar. 3, 2020.
U.S. Appl. No. 16/583,991, the Office Action dated Jan. 13, 2020.
U.S. Appl. No. 16/360,641, the Office Actions dated Aug. 7, 2019 and dated Feb. 20, 2020.
U.S. Appl. No. 16/514,771, the Office Action dated Dec. 4, 2019, and the Notice of Allowance dated Mar. 18, 2020.
"Agreed Upon Procedures," Version 4.0, BITS, The Financial Institution Shared Assessments Program, Assessment Guide, Sep. 2008, 56 pages.
"An Executive View of IT Governance," IT Governance Institute, 2009, 32 pages.
"Assessing Risk in Turbulent Times," A Workshop for Information Security Executives, Glassmeyter/McNamee Center for Digital Strategies, Tuck School of Business at Dartmouth, Institute for Information Infrastructure Protection, 2009, 17 pages.
"Assuring a Trusted and Resilient Information and Communications Infrastructure," Cyberspace Policy Review, May 2009, 76 pages.
"Master Security Criteria," Version 3.0, BITS Financial Services Security Laboratory, Oct. 2001, 47 pages.
"Plugging the Right Holes," Lab Notes, MIT Lincoln Library, Posted Jul. 2008, retrieved Sep. 14, 2010 from http://www.ll.miLedufpublicationsflabnotesfpluggingtherightho! . . . , 2 pages.
"Report on Controls Placed in Operation and Test of Operating Effectiveness," EasCorp, Jan. 1 through Dec. 31, 2008, prepared by Crowe Horwath, 58 pages.
"Shared Assessments: Getting Started," BITS, 2008, 4 pages.
"Twenty Critical Controls for Effective Cyber Defense: Consensus Audit," Version 2.3, Nov. 13, 2009, retrieved on Apr. 9, 2010 from http://www.sans.org/critical-security-controls/print.php., 52 pages.

(56) References Cited

OTHER PUBLICATIONS

2009 Data Breach Investigations Report, study conducted by Verizon Business RISK Team, 52 pages.
Artz, Michael Lyle, "NetSPA: A Network Security Planning Architecture," Massachusetts Institute of Technology, May 24, 2002, 97 pages.
Boyer, Stephen, et al., Playing with Blocks: SCAP-Enable Higher-Level Analyses, MIT Lincoln Laboratory, 5th Annual IT Security Automation Conference, Oct. 26-29, 2009, 35 pages.
Browne, Niall, et al., "Shared Assessments Program AUP and SAS70 Frequently Asked Questions," BITS, 4 pages.
Buckshaw, Donald L., "Use of Decision Support Techniques for Information System Risk Management," submitted for publication in Wiley's Encyclopedia of Quantitative Risk Assessment in Jan. 2007, 11 pages.
Buehler, Kevin S., et al., "Running with risk," The McKinsey Quarterly, No. 4, 2003, pp. 40-49.
Chu, Matthew, et al., "Visualizing Attack Graphs, Reachability, and Trust Relationships with Navigator," MIT Lincoln Library, VizSEC '10, Ontario, Canada, Sep. 14, 2010, 12 pages.
Computer Network Graph-Bees, http://bioteams.com/2007/04/30/visualizing_complex_networks.html, date accessed Sep. 28, 2016, 2 pages.
Computer Network Graph—Univ. of Michigan, http://people.cst.cmich.edu/liao1q/research.shtml, date accessed Sep. 28, 2016, 5 pagse.
Crowther, Kenneth G., et al., "Principles for Better Information Security through More Accurate, Transparent Risk Scoring," Journal of Homeland Security and Emergency Management, vol. 7, Issue 1, Article 37, 2010, 20 pages.
Davis, Lois M., et al., "The National Computer Security Survey (NCSS) Final Methodology," Technical report prepared for the Bureau of Justice Statistics, Safety and Justice Program, RAND Infrastructure, Safety and Environment (ISE), 2008, 91 pages.
Dillon-Merrill, PhD., Robin L, et al., "Logic Trees: Fault, Success, Attack, Event, Probability, and Decision Trees," Wiley Handbook of Science and Technology for Homeland Security, 13 pages.
The Dun & Bradstreet Corp. Stock Report, Standard & Poor's, Jun. 6, 2009, 8 pages.
Dun & Bradstreet, the DUNSRight Quality Process: Power Behind Quality Information, 24 pages.
Edmonds, Robert, "ISC Passive DNS Architecture", Internet Systems Consortium, Inc., Mar. 2012, 18 pages.
Equifax Inc. Stock Report, Standard & Poor's, Jun. 6, 2009, 8 pages.
Hacking Exposed 6, S. McClure et al., copyright 2009, 37 pages.
Ingols, Kyle, et al., "Modeling Modern Network Attacks and Countermeasures Using Attack Graphs," MIT Lincoln Laboratory, 16 pages.
Ingols, Kyle, et al., "Practical Attack Graph Generation for Network Defense," MIT Lincoln Library, IEEE Computer Society, Proceedings of the 22nd Annual Computer Security Applications Conference (ACSAC'06), 2006, 10 pages.
Johnson, Eric, et al., "Information Risk and the Evolution of the Security Rating Industry," Mar. 24, 2009, 27 pages.
Lippmann, RP., et al., "An Annotated Review of Papers on Attack Graphs," Project Report IA-1, Lincoln Laboratory, Massachusetts Institute of Technology, Mar. 31, 2005, 39 pages.
Lippmann, RP., et al., "Evaluating and Strengthening Enterprise Network Security Using Attack Graphs," Project Report IA-2, MIT Lincoln Laboratory, Oct. 5, 2005, 96 pages.
Lippmann, Rich, et al., NetSPA: a Network Security Planning Architecture, MIT Lincoln Laboratory, 11 pages.
Lippmann, Richard, et al., "Validating and Restoring Defense in Depth Using Attack Graphs," MIT Lincoln Laboratory, 10 pages.
MaxMind, https://www.maxmind.com/en/about-maxmind, https://www.maxmind.com/en/geoip2- isp-database, date accessed Sep. 28, 20116, 3 pages.
Method Documentation, CNSS Risk Assessment Tool Version 1.1, Mar. 31, 2009, 24 pages.
Netcraft, www.netcraft.com, date accessed Sep. 28, 2016, 2 pages.
NetScanTools Pro, http://www.netscantools.com/nstpromain.html, date accessed Sep. 28, 2016, 2 pages.
Network Security Assessment, C. McNab, copyright 2004, 13 pages.
Nye, John, "Avoiding Audit Overlap," Moody's Risk Services, Presentation, Source Boston, Mar. 14, 2008, 19 pages.
Paxson, Vern, "How the Pursuit of Truth Led Me to Selling Viagra," EECS Department, University of California, International Computer Science Institute, Lawrence Berkeley National Laboratory, Aug. 13, 2009, 68 pages.
Proposal and Award Policies and Procedures Guide, Part I—Proposal Preparation & Submission Guidelines GPG, The National Science Foundation, Feb. 2009, 68 pages.
Rare Events, Oct. 2009, JASON, The MITRE Corporation, Oct. 2009, 104 pages.
Report to the Congress on Credit Scoring and Its Effects on the Availability and Affordability of Credit, Board of Governors of the Federal Reserve System, Aug. 2007, 304 pages.
RFC 781, https://tools.ietf.org/html/rfc781, date accessed Sep. 28, 2016, 3 pages.
RFC 950, https://tools.ietf.org/html/rfc950, date accessed Sep. 28, 2016, 19 pages.
RFC 954, https://tools.ietf.org/html/rfc954, date accessed Sep. 28, 2016, 5 pages.
RFC 1834, https://tools.ietf.org/html/rfc1834, date accessed Sep. 28, 2016, 7 pages.
SamSpade Network Inquiry Utility, https://www.sans.org/reading-room/whitepapers/tools/sam-spade-934, date accessed Sep. 28, 2016, 19 pages.
SBIR Phase I: Enterprise Cyber Security Scoring, CyberAnalytix, LLC, http://www.nsf.gov/awardsearch/showAward.do?AwardNumber=I013603, Apr. 28, 2010, 2 pages.
Security Warrior, Cyrus Peikari, Anton, Chapter 8: Reconnaissance, 6 pages.
Snort Intrusion Monitoring System, http://archive.oreilly.com/pub/h/1393, date accessed Sep. 28, 2016, 3 pages.
Stone-Gross, Brett, et al., "FIRE: Finding Rogue Networks," 10 pages.
Taleb, Nassim N., et al., "The Six Mistakes Executives Make in Risk Management," Harvard Business Review, Oct. 2009, 5 pages.
The CIS Security Metrics v1.0.0, The Center for Internet Security, May 11, 2009, 90 pages.
The Fair Credit Reporting Act (FCRA) of the Federal Trade Commission (FTC), Jul. 30, 2004, 86 pages.
The Financial Institution Shared Assessments Program, Industry Positioning and Mapping Document, BITS, Oct. 2007, 44 pages.
Wikipedia, https://en.wikipedia.org/wiki/Crowdsourcing, date accessed Sep. 28, 2016, 25 pages.
Williams, Leevar, et al., "GARNET: A Graphical Attack Graph and Reachability Network Evaluation Tool," MIT Lincoln Library, VizSEC 2009, pp. 44-59.
Williams, Leevar, et al., "An Interactive Attack Graph Cascade and Reachability Display," MIT Lincoln Laboratory, 17 pages.
BitSight, "Cyber Security Myths Versus Reality: How Optimism Bias Contributes to Inaccurate Perceptions of Risk", Jun. 2015, Dimensional Research, pp. 1-9.
U.S. Appl. No. 13/240,572 as of Oct. 7, 2015, application as filed and pending claims, 45 pages.
U.S. Appl. No. 61/386,156 as of Oct. 7, 2015. 2 pages.
U.S. Appl. No. 13/240,572 and pending claims as of Mar. 22, 2016, 10 pages.
U.S. Appl. No. 14/944,484 and pending claims as of Mar. 22, 2016, 4 pages.
Provos et al., "The Ghost in the Browser Analysis of Web-based Malware", 2007 (9 pages).
Li et al., "Finding the Linchpins of the Dark Web: a Study on Topologically Dedicated Hosts on Malicious Web Infrastructures", IEEE, 2013 (15 pages).
Bhilare et al., "Protecting Intellectual Property and Sensitive Information in Academic Campuses from Trusted Insiders: Leveraging Active Directory", SIGUCC, Oct. 2009 (5 pages).
Jin et al, "Identifying and tracking suspicious activities through IP gray space analysis", MineNet, Jun. 12, 2007 (6 pages).

(56) References Cited

OTHER PUBLICATIONS

Chuvakin, "SIEM: Moving beyond compliance", RSA White Paper (2010) (16 pages).
U.S. Appl. No. 14/021,585 as of Oct. 7, 2015 and application as filed, 70 pages.
Pending claims for U.S. Appl. No. 14/021,585, as of Apr. 29, 2016, 2 pages.
Application as filed and pending claims for U.S. Appl. No. 13/240,572 as of Apr. 29, 2016, 46 pages.
Application as filed and pending claims for U.S. Appl. No. 14/944,484 as of Apr. 29, 2016, 4 pages.
U.S. Appl. No. 14/021,585 and pending claims as of Mar. 22, 2016, 2 pages.
Pending claims for U.S. Appl. No. 14/021,585, as of Nov. 18, 2015, 6 pages.
Application as filed, and pending claims of U.S. Appl. No. 13/240,572 as of Nov. 18, 2015, 45 pages.
Hachem, Sara; Toninelli, Alessandra; Pathak, Animesh; Issany, Valerie. Policy-Based Access Control in Mobile Social Ecosystems. 2011 IEEE International Symposium on Policies for Distributed Systems and Networks (POLICY). Http://ieeexplore.ieee.org/stamp/stamp.jsp?arnumber=5976796. 8 pages.
Srivastava, Divesh; Velegrakis, Yannis. Using Queries to Associate Metadata with Data. IEEE 23rd International Conference on Data Engineering. Pub. Date: 2007. http://ieeexplore.ieee.org/stamp/stamp.jsp?arnumber=4221823, 3 pages.
Gephi (gephi.org), accessed on the internet at https://web.archive.org/web/20151216223216/https://gephi.org/; Dec. 16, 2015; 1 page.
mile 2 CPTE Maltego Demo, accessed on the internet at https://www.youtube.com/watch?v=o2oNKOUzPOU; Jul. 12, 2012; 1 page.
"Neo4j (neo4j.com)," accessed on the internet at https://web.archive.org/web/20151220150341/http://neo4j.com:80/developer/guide-data-visualization/; Dec. 20, 2015; 1 page.
"Creating Transparency with Palantir," accessed on the internet at https://www.youtube.com/watch?v=8cbGChfagUA; Jul. 5, 2012; 1 page.
"Palantir Cyber: Uncovering malicious behavior at petabyte scale," accessed on the internet at https://www.youtube.com/watch?v=EhYezV06EE; Dec. 21, 2012; 1 page.
Borgatti, et al., "On Social Network Analysis in a Supply Chain Context," Journal of Supply Chain Management; 45(2): 5-22; Apr. 2009, 18 pages.
Carstens, et al., "Modeling Company Risk and Importance in Supply Graphs," European Semantic Web Conference 2017: The Semantic Web pp. 18-31.
Gundert, Levi, "Big Data in Security—Part III: Graph Analytics," accessed on the Internet at https://blogs.cisco.com/security/big-data-in-security-part-iii-graph-analytics; Cisco Blog, Dec. 2013, 8 pages.
Jean, "Cyber Security: How to use graphs to do an attack analysis," accessed on the internet at https://linkurio.us/blog/cyber-security-use-graphs-attack-analysis/; Aug. 2014, 11 pages.
"Palantir.com," accessed on the internet at http://www.palantir.com/; Dec. 2015; 2 pages.
KC Claffy, "Internet measurement and data analysis: topology, workload, performance and routing statistics," accessed on the Internet at http://www.caida.org/publications/papers/1999/Nae/Nae.html., NAE '99 workshop, 1999, 22 pages.
"Maltego XL," accessed on the Internet at https://www.paterva.com/web7/buy/maltegoclients/maltego-xl.php, 5 pages.
Massimo Candela, "Real-time BGP Visualisation with BGPlay," accessed on the Internet at https://labs.ripe.net/Members/massimo_candela/real-time-bgp-visualisationwith-bgplay), Sep. 30, 2015, 8 pages.
Noel, et al., "Big-Data Architecture for Cyber Attack Graphs, Representing Security Relationships in NoSQL Graph Databases," The MITRE Corporation, 2014, 6 pages.
Wagner, et al., "Assessing the vulnerability of supply chains using graph theory," Int. J. Production Economics 126 (2010) 121-129.
Moradi, et al., "Quantitative Models for Supply Chain Management," IGI Global, 2012, 29 pages.
Joslyn, et al., "Massive Scale Cyber Traffic Analysis: A Driver for Graph Database Research," Proceedings of the First International Workshop on Graph Data Management Experience and Systems (Grades 2013), 6 pages.
"About Neo4j," 1 page.
"Amazon Mechanical Turk," accessed on the internet at https://www.mturk.com/; 7 pages.
"Rapid7 Nexpose Vulnerability Scanner," accessed on the internet at https://www.rapid7.com/products/nexpose/download/, 3 pages.
"Tenable Nessus Network Vulnerability Scanner," accessed on the internet at https://www.tenable.com/products/nessus/nessus-professional; 13 pages.
"Computer Network Graph," http://www.opte.org; 1 page.
McNab, "Network Security Assessment," copyright 2004, 56 pages.
Gilgur, et al., "Percentile-Based Approach to Forecasting Workload Growth" Proceedings of CMG'15 Performance and Capacity International Conference by the Computer Measurement Group. No. 2015 (Year:2015).
Seneviratne et al., "SSIDs in the Wild: Extracting Semantic Information from WiFi SSIDs" HAL archives-ouvertes.fr, HAL Id: hal-01181254, Jul. 29, 2015, 5 pages.
Ingols, Kyle, et al., "Practical Experiences Using SCAP to Aggregate CND Data," MIT Lincoln Library, Presentation to NIST SCAP Conference, Sep. 24, 2008, 59 pages.

* cited by examiner

```
(B1 ) : 2019-01-01 14:45 UTC,  c7f731fed04d30b1303d291bcd6fe973dd1ad391,  192.0.2.178
(C1 ) : 2019-01-02 13:02 UTC,  c7f731fed04d30b1303d291bcd6fe973dd1ad391,  203.0.113.61
(D1 ) : 2019-01-02 16:39 UTC,  c7f731fed04d30b1303d291bcd6fe973dd1ad391,  192.0.2.178
(E1 ) : 2019-01-04 09:18 UTC,  c7f731fed04d30b1303d291bcd6fe973dd1ad391,  192.0.2.178

Device ID                     Allocated
                                                                          IP Address
```

FIG. 2

```
(B1 ) : 2019-01-01 14:45 UTC,  c7f731fed04d30b1303d291bcd6fe973dd1ad391,  192.0.2.178
(C1 ) : 2019-01-02 13:02 UTC,  c7f731fed04d30b1303d291bcd6fe973dd1ad391,  203.0.113.61
(D1*) : 2019-01-02 16:39 UTC,  8f1846f0a4498ddb78d0228cb170e161c9e8f773,  192.0.2.178
(E1*) : 2019-01-04 09:18 UTC,  8f1846f0a4498ddb78d0228cb170e161c9e8f773,  192.0.2.178

Device ID                     Allocated
                                                                          IP Address
```

FIG. 3

(B2): 2019-01-16 08:15 UTC, 9a260f3f47d7c73f4640d662f71087d10c2da76b, 203.0.113.61
(C2): 2019-01-16 08:18 UTC, 9a260f3f47d7c73f4640d662f71087d10c2da76b, 203.0.113.61
(D2): 2019-01-16 13:54 UTC, 9a260f3f47d7c73f4640d662f71087d10c2da76b, 192.0.2.179
(E2): 2019-01-16 15:02 UTC, 9a260f3f47d7c73f4640d662f71087d10c2da76b, 203.0.113.61

Device ID         Allocated IP Address

FIG. 5

(C1): 2019-01-02 13:02 UTC, c7f731fed04d30b1303d291bcd6fe973dd1ad391, 203.0.113.61

Device ID         Allocated IP Address (C1): 2019-01-02 13:02 UTC, c7f7 .. ad391, 203.0.113.61, 1234, "business-partner-guest"

Device ID    Allocated IP Address  Entity Identifier  SSID

FIG. 6

(B1): 2019-01-01 16:25 UTC, user1@example.com, 192.0.2.178
(C1): 2019-01-02 11:52 UTC, user1@example.com, 203.0.113.61
(D1): 2019-01-04 13:10 UTC, user1@example.com, 192.0.2.178
(E1): 2019-01-05 08:22 UTC, user1@example.com, 192.0.2.178

User ID    Allocated IP Address

FIG. 8

SYSTEMS AND METHODS FOR INFERRING ENTITY RELATIONSHIPS VIA NETWORK COMMUNICATIONS OF USERS OR USER DEVICES

CROSS-REFERENCE TO RELATED APPLICATIONS

This Application is a continuation of U.S. patent application Ser. No. 16/549,764, titled "Systems and Methods for Inferring Entity Relationships Via Network Communications of Users or User Devices" and filed on Aug. 23, 2019, which is hereby incorporated herein by reference in its entirety.

FIELD OF THE INVENTION

This disclosure generally relates to techniques for cybersecurity assessment and, more specifically, to observing and analyzing network communications and to inferring relationships among entities that are associated with the users and/or user devices that are involved in the observed network communications.

BACKGROUND

As organizations around the world, whether for profit, non-profit, or government rely increasingly on networked systems to obtain and to provide goods and services, security of an organization's computing and networking systems ("cybersecurity") is becoming increasingly important. Techniques to audit an organization's systems, including both hardware and software systems, are generally known. In some cases, however, performing a security audit of the organization's systems may not provide a comprehensive or accurate assessment of the security of those systems. One reason is that an organization likely has business relationships with several other organizations, such as affiliates, parts vendors, technology service providers, suppliers, distributors, customers, clients, accountants, lawyers, government regulators, etc. Personnel from these other business entities may regularly communicate with and access the organization's systems and/or data using public networks and/or the systems of those other business entities, which may not be audited and/or may not be secure. As such, in some cases, the assessment of security of the systems of an organization of interest can benefit from the knowledge of which other organizations regularly access its systems.

Obtaining this information is not an easy or a straightforward task, however. The organizations themselves can be complex, having a hierarchical structure of several business entities, and one or more of those entities may form business relationships with other business entities. Moreover, the business relations can be dynamic. They may form at different points in time and may become dormant or may cease to exist after some time.

SUMMARY

Various embodiments described herein feature techniques and systems that can infer relationships among entities by analyzing network traffic associated with various entities. As the existence of a relationship between two entities is not known initially, the traffic is not monitored specifically, in a targeted manner, between a pair of entities. Rather, the traffic associated with several entities at large is observed. From the observed traffic, complementary occurrences of user devices or user identifiers are detected to be associated with assets, e.g., network or physical asserts, of two different entities. This detection can lead to an inference of the existence of relationship between those two entities.

In general, the system described herein implements various techniques for programmatically discovering possible relationships among organizations, and thus builds a business intelligence profile on arbitrary sets of organizations and companies. This information is valuable for risk management solutions as it identifies business partnerships without the need to engage with that company directly. This can be critical when compiling various risk metrics of organizations as these third-party relationships can have a significant impact on the operations of those organizations. These business relationships and business intelligence discovered using these methods may include:

- customers of an organization, including both B-2-C and B-2-B organizations.
- members of the organization's supply chain, for example such as those manufacturing parts, supplying parts, conducting designs, etc.
- business partners, for example such as those working together developing/marketing a shared product, completing a contract together, etc.
- information technology providers and cloud-based applications or hosting services;
- one company is in the process of evaluating or conducting an acquisition of another company; and
- any other reason why two organizations may be associating with one another.

Some techniques may not be able to identify the specific type of business relationship between the two organizations, but can infer the possibility that a business relationship exists. The fact that the possible business relationship has been identified, and the parties identified, may then allow the type of business relationship to be inferred. For example, if a business relationship has been identified between a defense contractor and a company that specializes in developing firmware for GPS receivers, a manufacturer-supplier relationship may be inferred. Likewise, if a relationship is inferred between a defense contractor and a hydrostatic pump testing facility, a consumer-service provider relationship may be inferred. The strength of the business relationship may be inferred by factors such as the duration of the relationship appearing through the techniques described herein, as well as whether the relationship appears through more than one techniques.

In various embodiments, an inferencing system described herein can use the following techniques, either individually or in combination for discovering relationships. These include the following.

Technique 1—Observing and cataloging the activity and patterns of devices accessing the Internet through organizational networks, and thus associated with an IP address revealed through cookies, device fingerprints, or unique identifiers associated to the device. By mapping the IP addresses that these cookies, fingerprints, or device identifiers have appeared on to the organizations or companies responsible for those network resources, a determination can be made as to which organizations that user or device is associated with. Modeling the characteristics of those visits to these organizations facilitates the inference of relationships between those organizations. Examples of data sources include but are not limited to datasets derived from web site operators, ad technology, marketing technology, email and other forms of common and uncommon forms of transactions.

Technique 2—Observing and cataloging the activity and patterns of devices accessing the Internet through organizational networks to a particular service, and thus having an association with an IP address which are then revealed through user account information or other user identifiers or user-like identifiers specifically provided by the user or device. These may include, for example, email readability metrics (such as a system as described in U.S. application Ser. No. 16/015,686, attached as Appendix A), email address, or phone number. For example, a user logging into a service of any protocol or application (e.g. IMAP, POP3, XMPP, or web-based services) from multiple IP addresses implies that the user had access to that network with the corresponding IP address. Similar to modeling on characteristics of the device, one may look at the characteristics of the user behavior to understand that relationships exist and of which type.

Technique 3—Dissecting network flow data and identifying the two parties for a given network transaction. By mapping the two IP addresses that are communicating with each other and referencing other characteristics about that transaction (protocol, port, length of session, etc.), one can infer a relationship of various certainty. Various protocols establish a stronger relationship between companies than others, such as SMTP (email) and XMPP (instant messaging), while others might reveal a relationship but is likely to be weaker, such as HTTP/S (web site visits) and FTP (file transfer).

Technique 4—Information made publicly available by various malware detection software applications and hardware appliances can reveal the parties of a particular email or message. This may include various combinations of: the source party via its originating MTA or device IP address, source domain, and/or source email address combined with the destination party via one of its receiving MTA IP addresses, destination domain, and/or destination email address. By cataloging such information and mapping the email domains to organizations and companies, an index and database of companies can be compiled that reveals communications among the companies. Additional filtering can be performed to selectively choose individuals at a company that might reveal a stronger relationship compared to another, such as a CEO, if the contextual information such as revealed email addresses can be joined with an external dataset.

Technique 5—Precise GPS coordinate data sets that contain IP address information or a device or user identifier can reveal users employed by a specific company at the physical location of another company or organization, and thus a possible relationship might exist between the two. This is a common occurrence for situations where a user has a VPN enabled on their device and thus their publicly visible IP address is their company's network, but the user's physical location is at a different location. By using geo-based APIs, one can reverse the geo-coordinates to a physical address and subsequently map this to an organization.

One or more of these techniques may be used to discover new potential relationships, to maintain known relationships, and to terminate known relationships. Embodiments of an inferencing system can use a variety of techniques to increase confidence in relationships, defined as company pairs, as well as to infer the type of relationship that exists.

Such an inferencing system can work in concert with systems that map IP addresses to businesses and organizations, such as those defined in U.S. Pat. No. 9,438,615, incorporated herein by reference in its entirety. Other mechanisms may also be used to determine the authoritative ownership of various forms of digital assets (e.g., domains, IP addresses, etc.) such as using direct sources (e.g. DNS, WHOIS data from RIRs, etc.), or those derived from such sources (e.g. firms or services extracting this information).

Embodiments of an inferencing system using these techniques can apply the aforementioned techniques to model relationship strength and currency, as well as to apply ultimately a confidence value based on the respective companies' industries, products and services, and/or frequency of appearance in the data set(s).

Accordingly, in one aspect a method is provided for inferring a relationship between two entities. The method includes the step of receiving at a server a network observation dataset, where each data point in the dataset includes (a) a device identifier and, additionally, (b)(i) a network address or (b)(ii) a device location. The method also includes: selecting from the dataset a first-type data point that includes: (A) a first device identifier, and (B)(i) a first network address or (B)(ii) a first device location; and identifying a first entity associated with the first network address or the first device location. The method further includes: selecting from the dataset a second-type data point that includes: (A) the same first device identifier, and (C)(i) a second network address different from the first network address or (C)(ii) a second device location different from the first device location; and identifying a second entity that is different from the first entity and that is associated with the second network address or the second device location. The method further includes inferring a relationship between the first entity and the second entity. The inference of the relationship is associated with a baseline confidence level.

The first network address may include: a first Internet Protocol (IP) address, a first service set identifier (SSID), or a first basic SSID (BSSID), and the second network address may include a second IP address, a second SSID, or a second BSSID.

In some embodiments, the method includes selecting from the dataset a third-type data point that includes: (D) a second device identifier, and (C)(i) the second network address or (C)(ii) the second device location; and selecting from the dataset a fourth-type data point that includes: (D) the same second device identifier, and (B)(i) the first network address or (B)(ii) the first device location. The method may include increasing the baseline confidence level when the third-type and/or the fourth-type data points are selected.

In some embodiments, the method may include determining that: (i) a total number or frequency of the first-type data points in the dataset is at least equal to a specified home-count or home-frequency threshold; and also determining that: (i) a total number or frequency of the second-type data points in the dataset is at least equal to a specified visitor-count or visitor-frequency threshold. The method may include increasing the baseline confidence level when the above-described determinations are made.

In some embodiments, the method includes receiving an enrichment attribute and testing whether the enrichment attribute is associated with the first entity or the second entity. In these embodiments, the method also includes increasing the baseline confidence level if the enrichment attribute is determined to be associated with the first entity or the second entity, and otherwise, decreasing the baseline confidence level or invalidating the inferred relationship. The enrichment attributed may be included in the first data point or the second data point.

The enrichment attribute may include an entity identifier, and the testing step includes determining whether the entity identifier identifies the first entity, the second entity, or a different third entity. Additionally or in the alternative, the enrichment attribute may include a service set identifier (SSID), and the testing step may include determining whether the SSID is associated with the first network address or the second network address or neither the first nor the second network address. Additionally or in the alternative, the enrichment attribute may include a physical location associated with the first or the second network address.

In some cases, the enrichment attribute may include a classification of the first or the second network address, where the classification may indicate whether the corresponding network address is a residential address, an address associated with a cellular network, a business-related network address, etc. The testing step may include determining whether the classification indicates a business entity.

In some cases, the enrichment attribute may include a list of Access Points (APs) associated with the first network address, and the testing step may include determining whether one or more APs in the list are designated as non-guest or employee APs. Alternatively or in addition, the enrichment attribute may include a list of Access Points (APs) associated with the second network address, and the testing step may include determining whether one or more APs in the list are designated as guest or visitor APs.

In some cases, the enrichment attribute includes a list of devices associated with the first or the second network address and the list also includes a respective type of each device indicating, e.g., where the device is an endpoint device or sever device. The testing step may include determining whether one or more devices in the list are endpoint devices. If no devices in the list are endpoint devices, it is likely that the first or the second data points are erroneous.

In another aspect, a system is provided for inferring a relationship between two entities. The system includes a processor, and a network port in communication with the processor and adapted to receive from a data source a network observation dataset. Each data point in the dataset includes one or more of: (i) a device identifier, (ii) a user identifier, (iii) a network address, or (iii) a device location. The system also includes a memory coupled to the processor and having stored therein instructions which, when executed by the processor, program the processor to: select from the dataset a first-type data point that includes: (A)(i) a first device identifier or (A)(ii) a first user identifier and, additionally: (B)(i) a first network address or (B)(ii) a first device location. The instructions also program the processor to identify a first entity associated with the first network address or the first device location;

In addition, the instructions program the processor to select from the dataset a second-type data point that includes: (A)(i) the same first device identifier or (A)(ii) the same first user identifier and, in addition: (C)(i) a second network address or (C)(ii) a second device location. The instructions further program the processor to identify a second entity associated with the second network address or the second device location, and infer a relationship between the first entity and the second entity. Furthermore, the instructions program the processor to designate to the inferred relationship a baseline confidence level.

In some embodiments, the network port is adapted to receive an enrichment attribute, and the instructions further program the processor to: test whether the enrichment attribute is associated with the first entity or the second entity, and to increase the baseline confidence level, if the enrichment attribute is determined to be associated with the first entity or the second entity and, otherwise, decrease the baseline confidence level or invalidate the inferred relationship.

The enrichment attribute may include: (i) an entity identifier, (ii) a service set identifier (SSID), (iii) a physical location associated with the first or the second network address, (iv) a classification of the first or the second network address, (v) a list of Access Points (APs) associated with the first or the second network address and a respective type of each AP, or (vi) a list of devices associated with the first or the second network address and a respective type of each device. The enrichment attribute may be included in the first or the second data point.

In another aspect, a method is provided for inferring a relationship between two entities. The method includes the step of receiving at a server, a network observation dataset, where each data point in the dataset includes a user identifier and a network address. The method also includes selecting from the dataset a first-type data point including a first user identifier and a first network address; and identifying a first entity associated with the first network address. The method further includes selecting from the dataset a second-type data point that includes the same first user identifier and a second network address different from the first network address; and identifying a second entity that is different from the first entity and that is associated with the second network address. In addition, the method includes inferring a relationship between the first entity and the second entity, and associating a baseline confidence level with the inferred relationship.

In some embodiments, the method further includes selecting from the dataset a third-type data point including a second user identifier and the second network; and selecting from the dataset a fourth-type data point including the second user identifier and the first network address. The method may also include increasing the baseline confidence level when the third-type and/or the fourth-type data points are selected.

The method may include determining that: (i) a total number or frequency of the first-type data points in the dataset is at least equal to a specified home-count or home-frequency threshold; and determining that: (i) a total number or frequency of the second-type data points in the dataset is at least equal to a specified visitor-count or visitor-frequency threshold. The method may further include increasing the baseline confidence level when both above-described determinations are made.

In some embodiments, the method includes receiving an enrichment attribute; testing whether the enrichment attribute is associated with the first entity or the second entity; and increasing the baseline confidence level, if the enrichment attribute is determined to be associated with the first entity or the second entity and, otherwise, decreasing the baseline confidence level or invalidating the inferred relationship. The enrichment attribute may include: (i) an entity identifier, (ii) a service set identifier (SSID), (iii) a physical location associated with the first or the second network address, (iv) a classification of the first or the second network address, (v) a list of Access Points (APs) associated with the first or the second network address and a respective type of each AP, or (vi) a list of devices associated with the first or the second network address and a respective type of each device. The enrichment attribute may be included in the first or the second data point.

BRIEF DESCRIPTION OF DRAWINGS

The present invention will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the invention. In the drawings:

FIGS. 2 and 3 depict example data points observed and collected using the technique described with reference to FIG. 1;

FIG. 5 depicts example data points observed and collected using the technique described with reference to FIGS. 1 and 4;

FIG. 6 depicts example data points observed and collected using the technique described with reference to FIGS. 1 and 4, where the data points are enriched according to some embodiments;

FIG. 8 depicts example data points observed and collected using the technique described with reference to FIG. 7;

DETAILED DESCRIPTION

Figure 1:
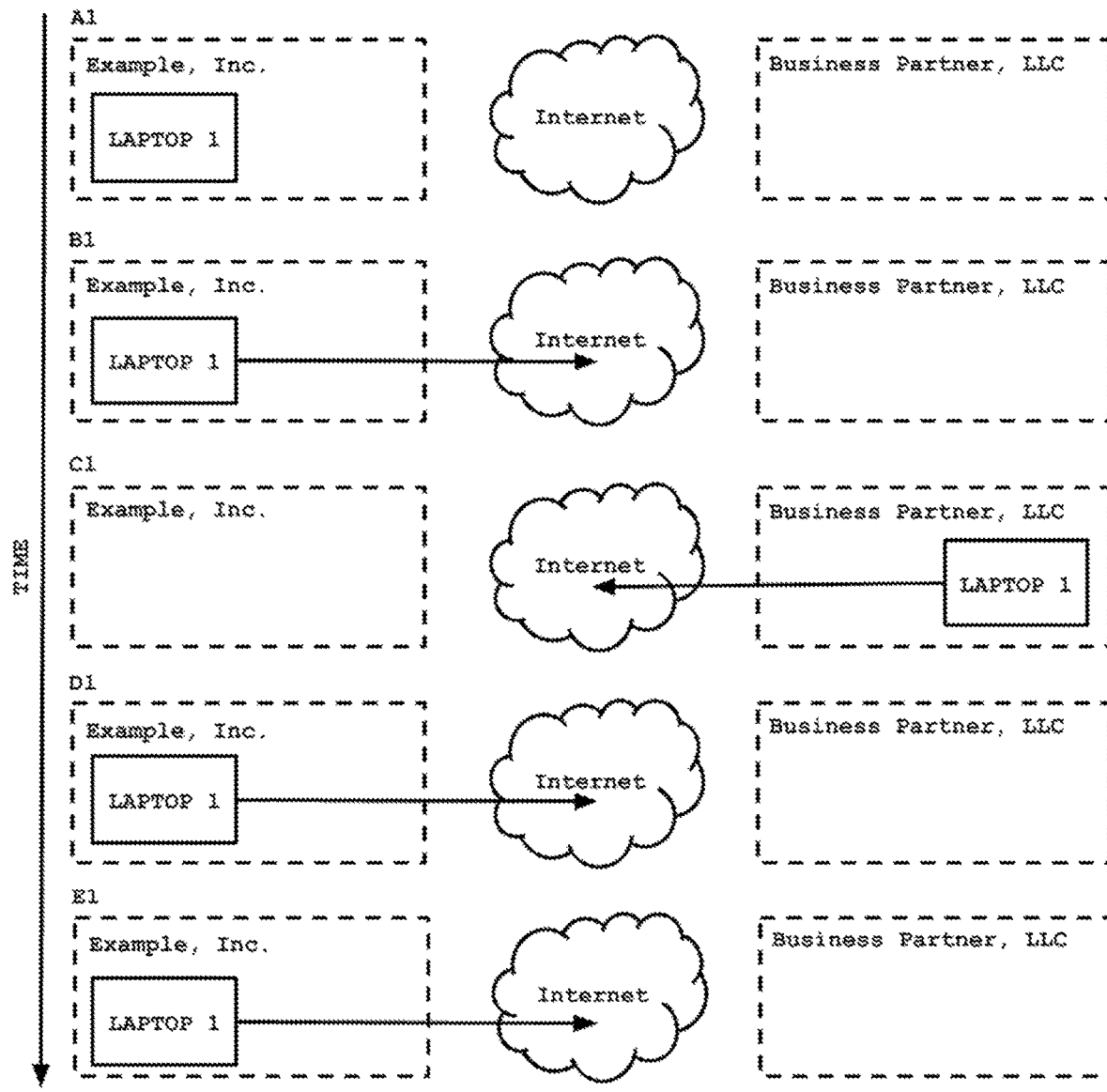
FIG. 1 schematically depicts a technique according to some embodiments for observing network traffic and collecting observations that may be used to infer a relationship between two entities, where the observations may include device identifies and IP addresses assigned to user devices.

Objectives of the systems and techniques described herein include the discovery and description of business-entity relationships amongst various commercial and other organizations. The data gathered by monitoring and analyzing network activity and/or communications, as described herein, may be used for many purposes, such as to understand the third-party ecosystem of a particular organization. This can be important to a security rating service tasked with assessing and/or ranking the strength or effectiveness of an organization's cybersecurity practices, as the overall cybersecurity risks at an organization can be affected by the cybersecurity practices at various third parties with whom the organization communicates regularly or frequently. Understanding the organization's technology ecosystem can also be important to other organizations operating with, considering, or evaluating a potential relationship with the organization. For example, the organization's cybersecurity data and rating allows for a more accurate view into potential effects of a breach, downtime event, or other business-impacting event, it allows for the continual monitoring of companies for third-party risk management purposes, they can be used to construct accurate risk assessment models for a given service, industry, or function type to support issuance of cyber-insurance, evaluation of security posture, or a probability of breach. This information can also be useful and important for understanding the relationships among organizations including general insurance firms, financial firms, government regulators, IT service providers, infrastructure providers, organizations performing competitive research, market intelligence firms, among others.

The techniques described herein each represent approaches to inferring business relationships initiated by the unintended behaviors typically performed by users of devices, or of the devices themselves. Some of these devices may not need an attentive user interacting with the device to instigate the data point that allows for a relationship to be constructed within the system. Some data points may be generated via programmatic APIs, services, SaaS platforms, application service providers, on-premise software, or other systems, where an explicit user action may not have occurred or may not be necessary to reveal the relationship.

Each technique describes the creation and collection of various data points that can be consumed by the same common inferencing system for processing data points that ingest data about business relationships. The inferencing system is agnostic to the source, although the system may consider the source and the technique for making decisions in terms of confidence that the data point is meaningful, for determining reliability of the data points including historical and future observations, and may consider other factors that influence the confidence of a particular business relationship built upon data points generated using these techniques. The inferencing system is not limited to these techniques, and in addition to using solely those described herein, can employ other techniques previously documented or implemented, such as those outlined in U.S. Pat. No. 9,438,615, the entire contents of which are incorporated herein by reference.

Each technique may reveal different types of business relationships, as the inferencing system and processing data points may reveal relationships that are generally agnostic to the specific form of relationship between two organizations or how that information is revealed, although, such additional information can be used as an input or indicator when determining the confidence of a particular relationship.

The techniques described herein optionally involve additional steps during or after ingesting data points generated by these techniques, that focus on increasing reliability of a given business relationship derived using these methods, each of which is described below. However, these techniques can be enhanced by understanding relationships derived through other known techniques, for example, to increase confidence in other plausible relationships, or for relationships that are already known to be accurate by an inferencing system. Such relationships can be used, for example, in a supervised machine learning model as inputs based on the data sets, thus training the system to favor transactions and activities that lead to higher confidence results.

Technique 1: Inferencing Based on Device ID and IP Addresses Association

This inferencing technique for identifying a possible business relationship between two entities is based on assumptions and observations that devices, or the owners of those devices, may have an implicit or explicit relationship with or dependency on the organizations that provide and operate the networks to which those users and/or their devices are connected. In general, data points that contain identifiers associated with devices are collected as information indicating the IP address the devices use, as viewed by another device on the Internet. These data points are analyzed to understand the networks and the connection behavior of those devices on different networks through time. The data set typically includes a timestamp, an identifier for the device, which may be associated to an application on the device, as well as the IP address of the device as viewed externally. Other information about the device, its network, or other contextual information may be included within the dataset. Examples of such information include the device's internal (LAN) IP address, Dynamic Host Configuration Protocol (DHCP) lease time, etc. This additional information may also include multiple device identifiers and/or the information collected according various other entity relationship inferencing techniques that are described herein.

The identifier of a device may take different forms, either individually or in combination with other identifiers, including but not limited to a unique device identifier as provided by the operating system of the device (such as a UDID), an identifier provided by the manufacturer (such as a serial number), an identifier provided to a browser on the device (e.g., using a cookie), an identifier as provided by a mobile application on the device to the application itself (an application-specific unique identifier), an identifier associated to a device modem (such as an IMEI number), an identifier associated to the network interface (such as a MAC address), an identifier associated with the SIM card (such as the SIM number), an identifier associated with the telephony services (such as a phone number), an international mobile subscriber identity (IMSI) number, an identifier associated with a hotspot (such as a SSID and or BSSID). A form of identifier associated with a device as provided in the data set may be generic and may be present in other unrelated devices that are not in the data set. In some cases, the form of identifier may be unique to the data set itself, e.g., a salted hash of one or more other identifiers. In general, the choice of the form of the device identifier has no significant bearing on the quality or integrity of system is producing accurate results.

Some identifiers may span multiple devices, such as a telephone number that is associated to both a mobile phone as well as a laptop, or multiple mobile devices, particularly if the phone number is associated with a VoIP service. Some identifiers, such as cookies or phone numbers, may be logically applied to the device or to the user by the application that provided the cookie, but this technique is generally agnostic to the use of the application. The identifier associated with the device may be perpetual or it may be time-limited, but it may only be valuable if it is distinct from all other devices, and if it is visible on two or more data points. In general, at least two data points are needed because the same device ID must be seen on two networks that are respectively associated with two different entities—so that a relationship can be inferred between those two entities.

The data set may contain the IP address assigned locally to a device which, in some embodiments, may be an RFC1918 IP addresses In general, however, some networks may assign a publicly-routable IP address directly to the device, where the IP address can be associated with an organization. This can be beneficial and accurate, particularly if other observer devices on the Internet view the device of interest transgressing through an explicit proxy where the IP address assigned to the device is changed to that of the proxy. For example, when a device has an RFC1918 assigned address, generally it can only communicate with other devices on the Internet if it uses a Proxy or Network Address Translation (NAT) function. This will change the IP address associated with the data communication to be a public IP address. In many cases, this IP address also belongs to the same company, i.e., the company of interest.

The IP address may be the form of an IPv4 address or an IPv6 address. An IPv6 address may allow for noise reduction if the device is connected to multiple networks that use SLAAC and embed the device's MAC address into the IPv6 address. The IP addresses for the different data points corresponding to a particular device can be independent of each other. Also, whether the device has previously connected to an IPv4 network and subsequently connects to an IPv6 network or vice versa has no bearing on the integrity or quality of the data. Only when a device connects to two or more networks supporting SLAAC for IPv6 does the IP address itself have a bearing into reducing noise in the network.

The user device may be any Internet-capable device, such as a laptop, desktop, mobile phone, Internet of Things (IoT) device, etc. Neither the age of the device, nor the age of the operating system running on the device, has any significant bearing on the quality of the data received from or the observations made about the device according to the above-discussed attributes. The device may or may not be used often by one individual, and may be used by many individuals. Likewise, the device may not be used by any person, other than the possibility of the device being serviced by a person. The actions of the software on the device may be responsible for the generation of data points within the data set.

The originator of data points that form the dataset may take many forms, and data points in many different forms may be combined prior to analysis thereof by an inferencing system without the need to differentiate between those forms. The different forms include the information collected by the developers of various mobile applications that are installed on the device, information collected by the operators of web applications and websites, information collected by third-parties such as that collected by various add-ons or libraries embedded within the applications or websites, information collected by mobile or telephone operators, and many others that may understand or know at a certain time what an identifier associated with a device is as well as what the IP address associated with the device is. When both of these are known by any observer, including the time of observation by that observer, the observed information may be included in a data set used for relationship inferencing described herein. The observed data points may be received at a computer/server analyzing these data points periodically or in an on-demand manner, or when a particular system making the observations transmits those observations/data points to the computer/server analyzing the data points.

FIG. 1 demonstrates individual data points regarding a device and its identifiers and IP addresses assigned to the device, including the context within which the device is operating and with whom the device is communicating. More specifically, FIG. 1 demonstrates a peculiar behavior that an inferencing system may identify from a dataset. According to this particular behavior, a device (Laptop 1) is observed on the networks of two different organizations, but more frequently at one organization than at the other.

With reference to FIG. 1, at step "A1" the device (Laptop 1) connects to local network provided by a local system, where the local system and network are controlled and/or used by an entity "Example, Inc." This association can be determined by associating the IP address assigned to the device to the organization known to be controlling or using that IP address.

At step "B1", the device (Laptop 1) connects to a remote system (e.g., a web service or a web application) via the Internet. This action may have been initiated by the user, by the device itself, by a software operating on the device, and/or may be initiated in another form that would cause the device to seek an Internet transaction. During this transaction the device provides the remote system with an identifier that uniquely identifies the device. Such an identifier may have been provided to the device by the local system providing the network to which the device is connected. In some cases, the device may connect to the remote system more than once, and the remote system may allocate a unique identifier to the device. The device identifier may also be provided by a third party, such as the device manufacturer, or the maker of the operating system installed on the device. In general, the device identifier can be any of the several types of identifiers that are described above. Also, the device need not be a laptop. It can be any device, such as those described above, that can connect to a network.

An observation made by the remote system such as a particular device having a particular device identifier connecting at a certain time to a network and was allocated a particular IP address controlled by a certain entity, represents one data point. In some cases, a transaction between a client, i.e., the device of interest, and the remote system comprises the data point(s), rather than the transactions themselves. For example, a mobile application may periodically collect information about device identifiers and assigned IP addresses, and report it to a remote system.

At step "C1," the device (Laptop 1) has connected to a different network, in this case ultimately belonging to "Business Partner, LLC", which is responsible, controls, uses, and allocates to the devices on its network different IP address(es) than those used by "Example, Inc." However, the previously provided identifier remains the same in its earlier and follow-up transaction with the remote system.

At step "D1", the device (Laptop 1) returns to the previous network and initiates another transaction with the remote system. Likewise, at a later point the device performs another transaction with the remote system at step "E1". From these observations, the inferencing system may determine that a particular device connects to the network(s) of Entity "Example, Inc." frequently, and that the same device also connects to the network(s) of "Business Partner, LLC." Based on these determinations, the inferencing system may infer a business relationship between the two entities "Example, Inc." and "Business Partner, LLC."

The transactions discussed above may result in example data points shown in FIG. 2, where these transactions were received by the remote system, and the remote system observed and recoded the data points regarding the observed transactions with the device. As seen in FIG. 2, the allocated IP address changes when the device moved to a different network belonging to the other organization but the device identifier remained fixed. The IP address belonging to "Example, Inc." may change between transactions, and the system ingesting these data points may need to understand that the old and new IP address both belong to "Example, Inc." This situation is common in cases where an organization has more than IP address, or in a case where the organization has its IP address dynamically assigned by the Internet service provider providing the IP address to the organization.

In some cases, the identifier for the device may change at some time between different transactions, as shown in the example data set depicted in FIG. 3. In this case, B1 and C1 still demonstrate a plausible link between "Example, Inc." and "Business Partner, LLC," as discussed above, while the observations D1* and E1*, that may correspond to a different device, are associated with only one IP address (that is associated with "Example, Inc.") and, thus, may not provide additional information in this context.

Figure 4:
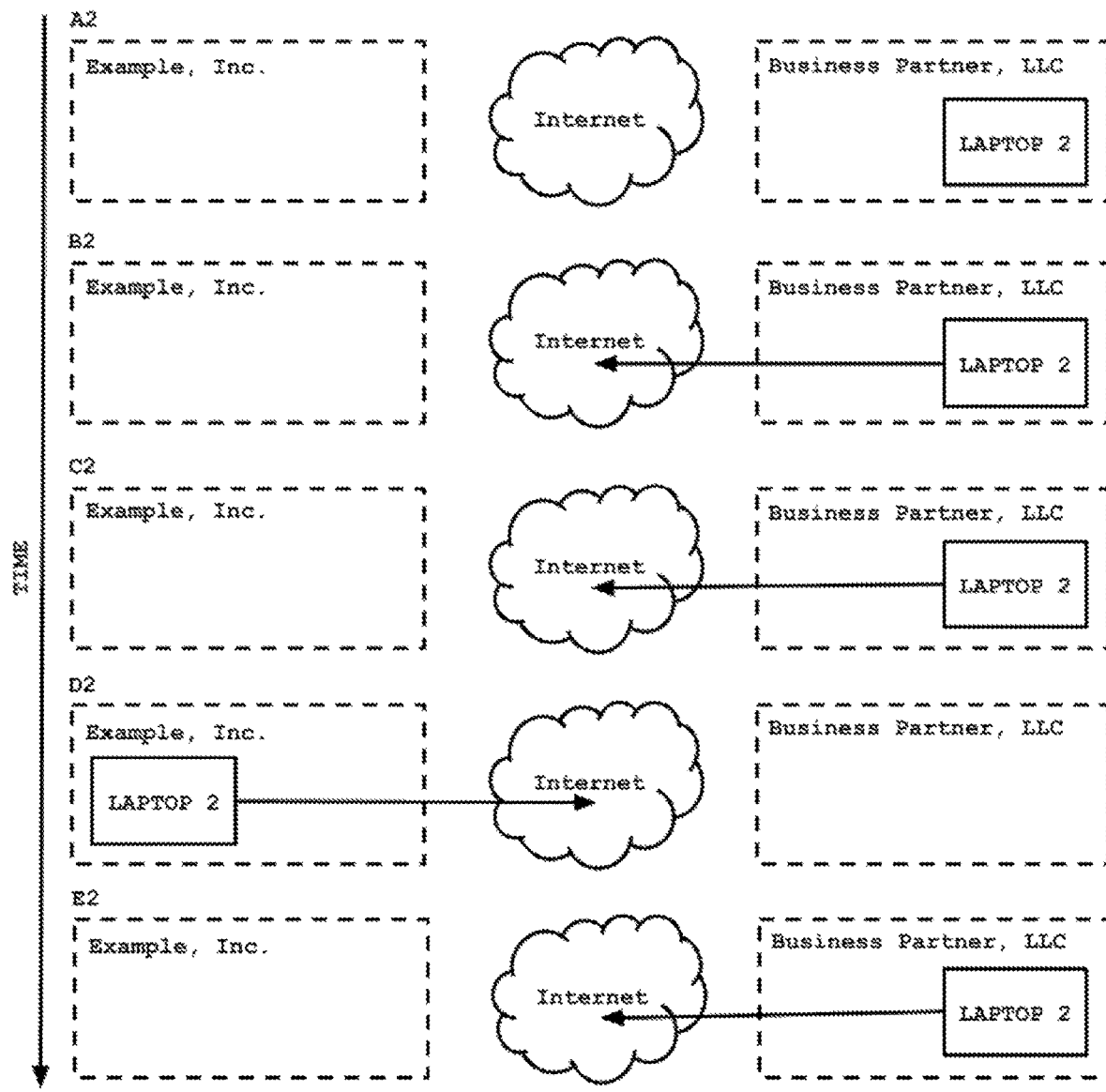
FIG. 4, like FIG. 1, also schematically depicts a technique according to some embodiments for observing network traffic and collecting observations that may be used to infer a relationship between two entities, where the observations may include device identifies and IP addresses assigned to user devices.

FIG. 4 illustrates a similar behavior except another device (Laptop 2) spends more time at the other organization. If a data set includes these additional observations, a more reliable relationship may be constructed. It is not necessary to infer business relationship between two entities as discussed with reference to FIG. 1. The additional data points may also provide information about the type of relationship. In general, the type of relationship can be inferred from a frequency distribution of the data points over time. For example, the behaviors of the devices of some organizations can be systematic based on the function of the business. Other the other hand, an auditing firm's devices may appear on another organization's network for a specific and continuous period of time and may then never revisit the network for a subsequent longer duration. Devices may be observed frequently on the networks of parts suppliers in the lead up to a product launch and then such observations may taper off as the product approaches mass production. The comparison and frequency of data point observations amongst all possible parts suppliers can lend insight into which part suppliers were chosen, and which were merely evaluated, and/or which parts supplies may be more significant to a particular business entity.

With reference to FIGS. 1 and 4, a different device (Laptop 2) is primarily associated with the "Business Partner, LLC," and conducts transactions with the same remote system discussed with reference to FIG. 1 or with a different remote system. Referring to FIG. 4, in "B2" the other device (Laptop 2) initiates a transaction with the remote system while connected to the network provided by another local system that is controlled, used, and/or operated by "Business Partner, LLC." This can be determined from the IP address allocated to the other device (Laptop 2). In some cases, the other local system may provide a device identifier to the new device. In other cases, the device identifier may be provided by the remote system, e.g., during an earlier transaction between the new device and the remote system. In yet other cases, a third party, such as a device manufacturer may provide a unique identifier to the new device. In general, the device identifier designated to the new device can be any of the several types of identifiers that are described above. Also, the new device need not be a laptop. It can be any device, such as those described above, that can be connected to a network.

In "C2" this transaction shown at "B2" is repeated. At "D2", the other device (Laptop 2) is connected to the network controlled, used, and/or operated by the "Example, Inc." This is determined from the IP address allocated to the other device. During this stage, the other device makes a transaction with the remote system while providing it with the same identifier, but the new IP address. At "E2" the other device (Laptop 2) returns to the original network.

These transactions may result in the data points that are shown in FIG. 5 and that are observed by the remote system described with reference to FIG. 4, which can be the same remote system discussed with reference to FIG. 1, or a different remote system. It can be inferred from transactions such as those described with reference to FIGS. 4 and 5 that a business relationship exists between the entities "Example, Inc." and "Business Partner, LLC." This inference is similar to that derived from the observations such as those described with reference to FIGS. 1-3. The confidence in this inference can be strengthened if the overall data set includes both subsets of observations, i.e., those described with reference to FIGS. 1-3 and those described with reference to FIGS. 4 and 5, as well, in part due to the complementary nature of the transactions that are observed.

Note that in D2, the IP address known to be associated with "Example, Inc." is different from the IP address known to be associated with the same entity "Example, Inc." in FIGS. 2 and 3. The IP address known to be associated with "Business Partner, LLC" is the same in FIGS. 2, 3, and 5. In some cases, the IP address associated with the first entity (e.g., "Example, Inc.") may be the same across all data points and the IP address associated with the second entity (e.g., "Business Partner, LLC" may be different in different data points, and in some cases the IP addresses associated with both entities can be different across different data points. The inferencing system can determine that different IP addresses are nevertheless associated with a particular entity/organization, e.g., using a mapping system described in U.S. patent application Ser. No. 16/015,686, entitled "Methods for Mapping IP Addresses and Domains to Organizations using User Activity Data," the entire contents of which are incorporated herein by reference.

The observable patterns discussed with reference to FIGS. 1-5 represent a possible relationship between the two organizations "Example, Inc." and "Business Partner, LLC" as the devices determined to be primarily associated with one or the other organization are observed at one or more times on the networks associated with the other organization. The existence of a relationship between two entities (such as service provider-client, manufacturer-distributor, manufacturer-buyer, manufacturer-parts vendor, service provider-consultant, etc.) can be inferred, as discussed above, from the observation(s) of user devices migrating between organizational networks.

In some cases, there may exist additional metadata about the network that can provide more contextual information into the networks to which the devices connect. Likewise, there are a number of data attributes that can improve confidence in the individual data points or when drawings an inference. Various such metadata and data attribute that can enrich the observed data points and inferences drawn therefrom, in general, are described below. There are specific types of enrichments that can benefit data points generated according to the processes described with reference to FIGS. 1-5. Specifically, understanding association between entities and IP addresses and/or having the contextual knowledge of the network that the allocated IP address is associated with (e.g. wireless networks) can be used to weigh the confidence of a data point or series of data points.

In particular, having knowledge of the wireless networks associated with each IP address can provide information about whether the user might be on a guest network of an organization, increasing the value of that particular data point. For example, FIG. 6 illustrates a possible enrichment of a data point, where the same unique device identifier (truncated for readability in the enriched version), which includes two additional fields. The first is the identifier of the entity as interpreted by a system processing these data points, and the second one is the wireless SSID known to be associated with this IP address. Using the enriched data point in combination with other data points (as discussed above), it can be inferred with higher confidence that the visit of the device of FIG. 1 was a transient visit. Depending on the type of the device (for example, an employee's personal device) the device may revisit a guest network repeatedly due to a policy at Business Partner, LLC requiring devices not issued by that entity to be connected to the guest network.

Users transitioning across multiple guest networks at different times, e.g. one data point at each, may not necessarily be sufficient to establish a relationship considering the user or device that created these data points might have been visiting different companies, and was not associated with or operating at any of those entities. As such, several data points across a period of time are generally necessary to understand reliably the "home" organization associated with a user or a user device. For example, with reference to FIG. 1, "Example, Inc." is the "home" of Laptop 1 and, with reference to FIG. 4, "Business Partner, LLC" is the "home" of Laptop 2. Understanding the typical origin or set of home networks for a device can be used to help inform when the device is transiently visiting the network or if is a data point that originated from a network that the device is typically observed from. This can be used to weigh unique networks for that device more highly than the home networks it repeatedly visits.

Determining the networks to which the devices typically connect can play an important role to solidify further the confidence, because the chance that a relationship exists increases if there are bi-lateral observations of devices connecting to two opposing networks or groups of networks. For example, if a device that is typically observed to be active on Network A visits Network Z for a brief period of time and returns to Network A, while another device that is typically observed to be active on Network Z visits Network A for a brief period of time and returns to Network Z, these observations demonstrate a bi-lateral relationship in the context of this data set. It is not necessary to have this observation of data points to conclude that a relationship exists, but such observations tend to increases the confidence that such a relationship may exist, as discussed above with reference to FIG. 4.

Another benefit that is gained by understanding the typically observed networks of a device is that one can disambiguate between activity profiles of devices, for example, to identify roaming device that visits many different networks, and is not related to any of those networks besides its home networks. For example, if a device traditionally is seen on Network A, and then is observed visiting Network Y briefly, and also briefly visiting Network Z, there is a lower probability of a relationship between Network Y and Network Z than there is between Network A and Network Y, or between Network A and Network Z. The more time a device has spent on a particular network is generally the network for which relationships with higher confidence may be inferred.

There is also no dependency for a specific device to revisit the same network of an organization in the future in order to conclude the re-observation of a relationship between organizations. It can be any other device that would also independently conclude a relationship between the organizations in question. The number of distinct and different devices that are observed in the data set that exhibit a relationship can also increase the confidence in the inference of a relationship.

The technique described above does not have a strong dependency on identifier lifetimes because it is agnostic to the particular device or the user. The device identifier lifetimes may be used, however, to derive an accurate population of devices. In general, the larger the population (i.e., the number of devices indicating the existence of a relationship) as a function of the entity size the higher the confidence of the interdependency or the inferred relationship between the two entities.

There are a number of factors and attributes about data points generated through the technique described above that can lead to noise, increase the likelihood of a data point being a false positive, or lead to a false positive conclusion about the existence of a relationship. One such example includes data points that have short-duration device identifiers associated to devices, such as those that rotate frequently. With such identifiers, the confidence in the inference drawn may be low because discovering other corresponding data points may be less likely. It would also be difficult to understand the devices' profile. As such, an inference system processing such a data set may need to observe data points over a longer time (e.g., a certain number of days or weeks) before considering data points various devices for relationship inference. Thus, in some embodiments, data corresponding to the devices having short-duration identifiers may be excluded or weighted less in favor of data corresponding to devices having a long duration or permanent identifiers.

Technique 2: Inferencing Based on User ID and IP Addresses Association

The second technique that an inferencing system identifying possible business relationships may use is based on the assumption and observation that users, or individuals themselves, who may operate one or may devices, may have an implicit or explicit relationship or dependency with the organizations that operate the networks to which those users or their devices connect. This technique uses data points containing identifiers associated with the user, as opposed to user devices, combined with information indicating which IP address the user's device uses as viewed by an external device on the Internet, and is based on subsequently understanding the networks and behavior of those users on different networks through time. In addition, the user identifier may contain extra information that implies the associative organization or other contextual information about the primary context of the user.

Each data point in the data set required for this technique generally includes a timestamp; a form of identifier associated with the user, which may be associated to a digital account that user operates (e.g. email address), or other identifier commonly limited to one person (e.g. phone number), or something intrinsic to the user (e.g. the user's name and zip code); as well as the IP address of the user device as viewed externally. Other information about the device, its network, or other contextual information based on the technique for which data points are extracted may be contained within the dataset, and such additional information can be useful to a system inferring business relationships. This extraneous information may be device identifiers in addition to the user identifier, additional information about the user, or it may be information used in connection with the other inferencing techniques described herein.

Like Technique 1, this technique also relies upon data points having IP address information. In general, an IP address in a data point may not be classified as an RFC1918 address, except where it is provided alongside the device's closest routable IP address to help with disambiguation when more than one user access a service under the same user identifier, or with other means to better manage volume. The IP address may be in the form of an IPv4 address or an IPv6 address, and the IP addresses for the different data points associated with a particular device may be independent of each other. Thus, whether a particular device previously connected to an IPv4 network and subsequently connects to an IPv6 network or vice versa has no bearing on the integrity or quality of the data. Networks configured to use SLAAC when using IPv6 addresses can provide additional information that may be used as a device identifier.

This technique is generally agnostic to the source of the data, where one type of service accessed by the users is not necessarily preferable to another. It is plausible that the data from various services is additive in its benefit since user identifiers are expected to remain constant across different services and service providers. For example, a user identifier that is an email address, "user1@example.com" will be the same across different services, but a device identifier that is a cookie is expected to be different across services, unless those services are controlled by a single party, and use the same cookie across such services. A user may have more than one type of identifier applied to that user, such that "user1@example.com" and "alice@example.com" are the same individual, but this technique is agnostic to that possibility and may treat these user identifiers as being associated with different users. An additional database can be used to determine, however, that "user1" and "alice" refer to the same person.

This technique is also generally agnostic to the action that triggered the transaction between the user and the service. Each service may provide the user different ways in which the users can interact with the service, such as through a web application over HTTPS, a mobile application, or third-party client over any other applicable protocol, such as IMAP, POPS, SMTP in the case of email service providers, etc. In one or more circumstances, the service may have the ability to identify the user and, if the service is capable of performing user identification, the particular user interaction with the service may produce a viable data point. This technique is also generally agnostic to the type of the device the user used for interacting with the service. For example, whether one or more data points are generated by users using mobile devices, or desktops, or laptops has no substantial bearing on the inferences drawn using this technique.

In addition, the user may perform different actions with the service, such as logging in or performing another action (e.g., querying information from a database; issuing a control command, etc.), the service supports. This technique is generally agnostic to what the individual is doing with the service other than that the service must be able to identify the user for the observed data points to be valuable. Lastly, the user themselves may trigger an action, or a programmatic or automatic process on the device may have caused a transaction to occur with the service. If the programmatic process or automatically performed a transaction (e.g., synchronizing local data on a user device with server data; reporting device status to a server, etc.), on behalf of the user and, as such, identified to the service the user, this transaction may be as viable as a user-initiated action for generating a data point. As such, any interaction with the service for which the user is identified from the service's perspective may provide as a valuable data point.

This technique can also analyze data points generated by many different types of services, and the data produced by any service that can at least identify a user as described herein. Examples of services include a variety of websites and web applications providing different functions, email providers, chat applications, among others. This also includes specific actions within other services such as the action of users reading individual emails (i.e., email readability metrics) as described in US 2018/0375822A1, the entire contents of which are incorporated herein by reference. US 2018/0375822A1 describes a system used for discovering IP addresses and domains that are controlled and operated by various organizations, and this data may also be used to infer business relationships as described herein.

Figure 7:
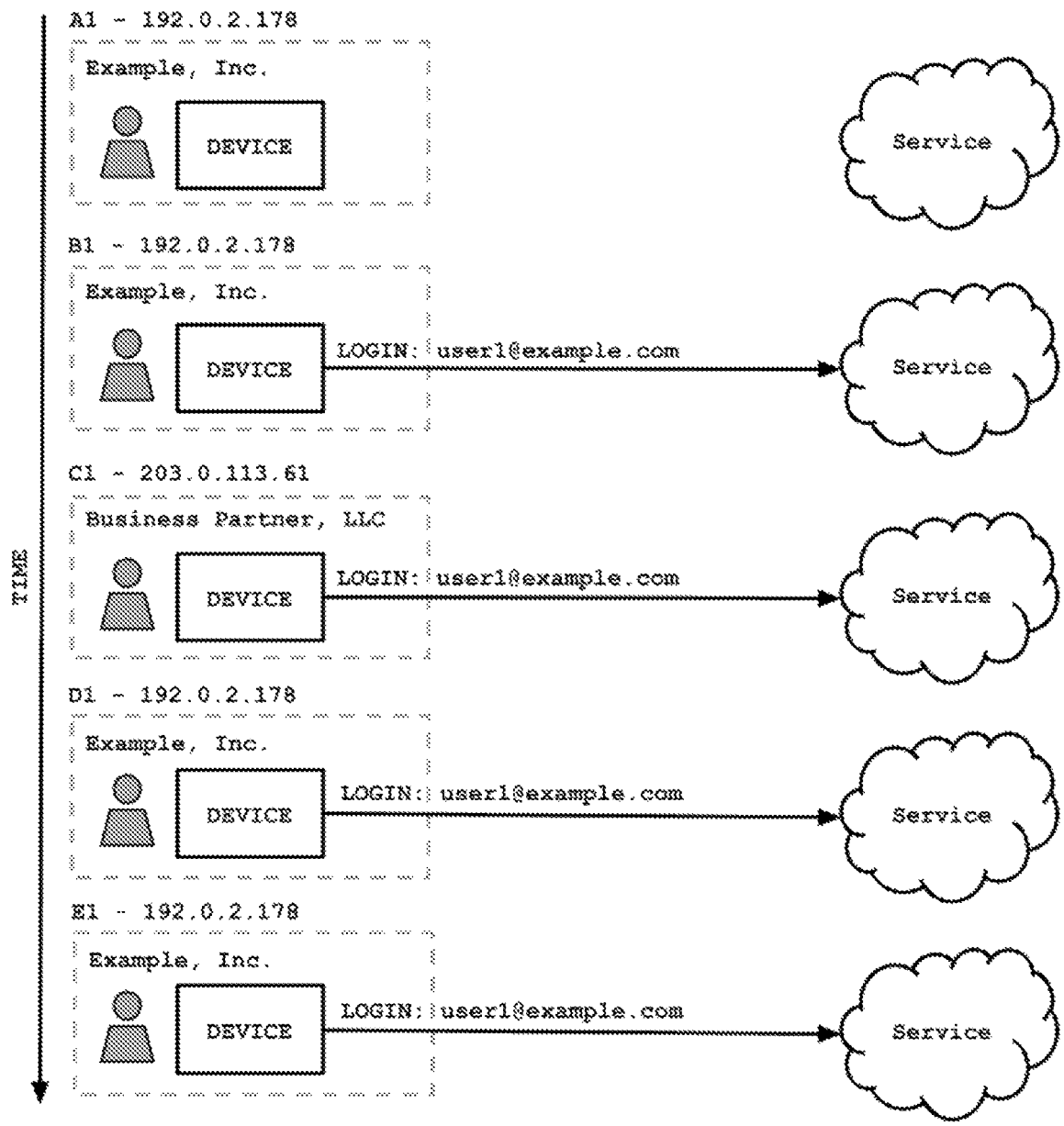
FIG. 7 schematically depicts a technique according to some embodiments for observing network traffic and collecting observations that may be used to infer a relationship between two entities, where the observations may include user identifies and IP addresses assigned to user devices.

FIG. 7 generally demonstrate the actions that may lead to the observation of individual data points regarding the user identifier and IP addresses. Specifically, the actions of a user and the user device begin at "A1," when the user connects the user device to a network provided, controlled, and/or used by "Example, Inc." This information can be known by associating the IP address allocated to the device to the organization known to be providing, controlling, or using that IP addresses.

At "B1," the user causes the user device to interact with a remote system that is accessible via the Internet and that provides a particular service. For example, the user may log in into the service. This action may have been initiated by the user, by the device itself, any software operating on the device, and/or any other operation that would cause the device to transact with the remote system. Within this transaction, the device provides the remote system with a user identifier, e.g., an email address including the username for the service. Note that the action in "B1" or any subsequent action can be any action that is functionally different from logging in, as long as the service can identify the user via a supported identifier.

Thereafter, at "C1," the user connects the user device to the network provided, controlled, and/or operated, by "Business Partner, LLC." While so connected, the user interacts with the service provided by the remote system by logging in. Here again, this transaction may include the same user identifier (e.g., the email address) but a different IP address would be associated with the user device. A new data point may thus be generated, associating the user identifier with an IP address associated with another entity (i.e., "Business Partner, LLC"). By comparing the data points observed at "B1" and "C1" it may be inferred that a relationship exists between "Example, Inc." and "Business Partner, LLC." Additional transactions, as well as transactions that extend over a long period of time (e.g., hours, days, weeks, etc.), and/or one or more other factors described below, can increase confidence in the inference of the relationship.

For example, at "D1," the user transitions back to the network provided, controlled, and/or used by "Example, Inc." and may transact again with the remote system providing service. The user may repeat this again at "E1." The sequence of transactions described above would result in the dataset that is shown in FIG. 8 and that the remote system/service may observe and store. This data set shows that the same user was at a different network for data point "C1" compared to the other data points shown in FIG. 8.

In order to derive relationship information from this dataset, the IP addresses allocated to the user device(s) must be mapped to organizations. In cases where the user identifier provides additional metadata, such as having a domain contained within the user identifier, that domain may be mapped to an organization. If the associative organization is confirmed not to be a general provider of services or an email service provider, then it can be used as an input to understand the primary-associated organization of the user, which could plausibly be corroborated by the information gathered through IP addresses themselves. Making associations between domain names and IP addresses is described in US 2018/0375822A1, and those techniques may be used in various embodiments.

Notionally, if the user identifier is in the form of an email address, the inferencing system can aggregate the data points observed for all users for a given domain and treat the corresponding user identifiers as one common identifier for the purposes of processing the data. However, since each user may have his or her own unique characteristics and may use the services in different ways, it is important to have an understanding of all users who are associated with which organizations. As such, performing the data reduction described above may be avoided in some embodiments. The entropy provided by each user and service may also help with machine learning processes built for analyzing this dataset.

Technique 3: Inferencing Based on IP Addresses and Protocol Association

The third technique generally involves inferring entity relationships is based on the assumption and observation that two entities may have a business relationship if the users or user devices associated with those entities are observed to be interacting with one another via certain communication protocols, the use of which may be determined from the port numbers used in the communication. As such, this technique uses data points that generally contain information about two devices, or more specifically two IP addresses, one belonging to one organization and another IP address belonging to another organization, as well as contextual information about the ports, and thus implied services and/or protocols. Other metadata about the information exchanged may also be included in one or more data points.

Thus, each data point in the data set used by this technique generally includes a timestamp, two IP addresses of the two systems or networks communicating with each other, and TCP or UDP port of the system with which the connection was originally established. One or more data points may include additional information such as the TCP or UDP port of the system that initiated the connection, the number of packets sent, the total size of the data exchanged, etc. Such information is commonly referred to as "flow" information that describes packet flows within networks.

The data points used in this technique generally do not use RFC1918 IP addresses because such an IP address usually does not provide any notional value as a standalone attribute. An RFC1918 IP address may be provided alongside a publicly routed IP addresses where the RFC1918 IP address can provide value disambiguating between multiple clients behind a NAT. The IP address may be the form of an IPv4 address or an IPv6 address. An IPv6 address may allow for noise reduction if the device is connected to multiple networks that use SLAAC and embed the device's MAC address into the IPv6 address.

With this technique, the accuracy of models and outputs from processing the data set may be higher when used with IP networks that either assign publicly-accessible, non- RFC1918 IP addresses directly to the client, or when used with networks that use IPv6 addresses, considering that these configurations are less likely to use NAT or PAT, which obfuscates many clients behind a single set of IP addresses from the perspective of an external party. Likewise, the inferencing system ingesting data needs to be aware when processing events of the different network configurations of organizations since one organization may have 10,000 computers and route all their traffic through 10 IP addresses, while another has 100 computers routing traffic through 100 IP addresses. If using the distinct number of IP addresses as a proxy for volume, the variations between networks must be kept in mind. For example, in some cases, a single IP address is shared by several devices, so a certain number of transactions associated with that IP address may actually originate from more than one devices.

In some embodiments, the inferencing system determines the type of configuration that is used. To this end, the inferencing system may use another datasets to estimate or to obtain the number of machines/servers associated with a specific IP address for a given period of time. Alternatively, the system may analyze the semantics of the communication protocol and the expected traffic volume of the application, using which the number of servers associated with an IP address can be identified. For example, if an application communicates every 10 seconds with a certain amount of data transferred the number of server systems associated with that IP address can be determined by observing the frequency of communications and/or the amount of data transferred.

The IP addresses included in different data points that are associated with the same device are generally independent of each other. Thus, whether a device previously connected to an IPv4 network and subsequently connects to an IPv6 network or vice versa has no bearing on the integrity or quality of the data. If a device connects to two or more networks that support SLAAC for IPv6, however, the IP address itself may have a bearing on reducing noise in the observed data.

A network operator may be able to produce data that is suitable for this technique. The network operator may be required to produce data that conforms with the limitations on unnecessary events associated with RFC1918 IP addresses. As such, the data points having RFC1918 IP addresses solely, without publicly-routable IP addresses, may be excluded from the data set. Also, the vast majority of network operators generally only observe traffic to and from their respective networks, which may introduce bias, or a filter, on certain specific class of events without containing data points unrelated to the respective network operator's network. As such, typically the best provider(s) for flow information in this context include various transit providers that route traffic on behalf of clients, customers, peers, etc.

Figure 9:
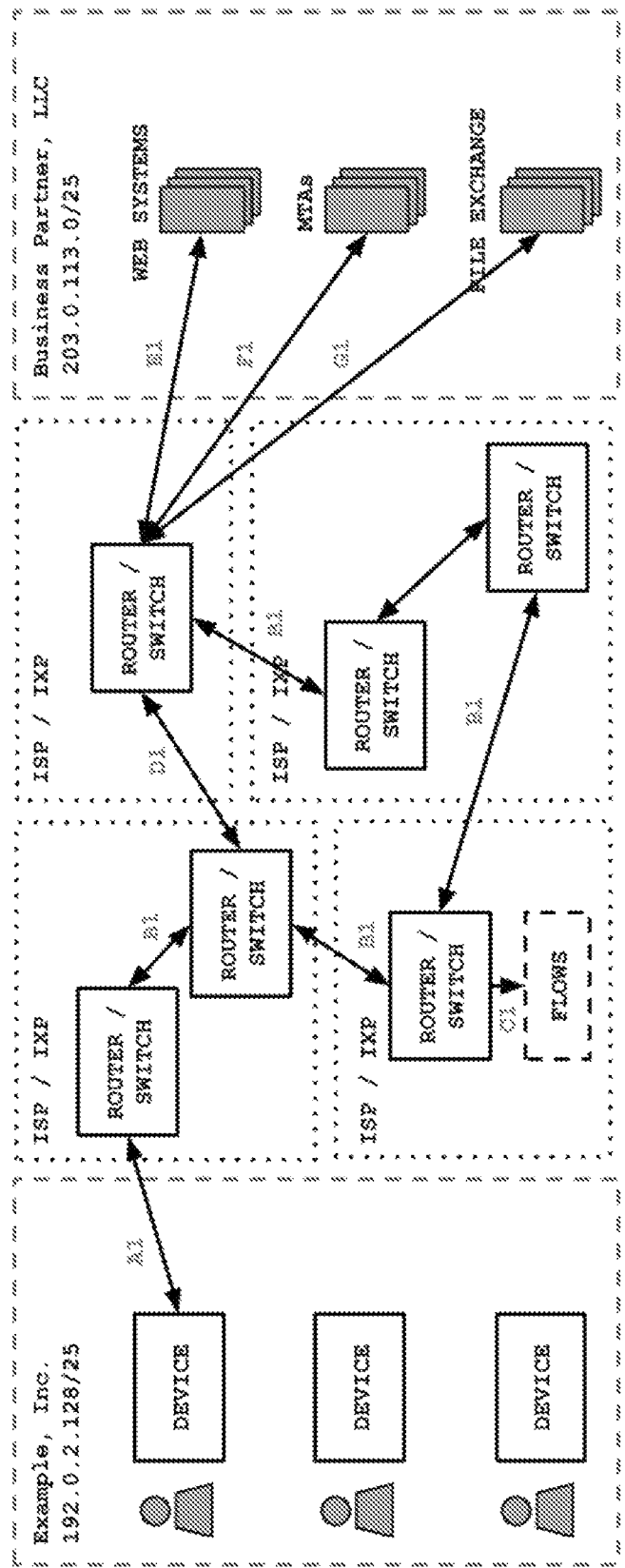
FIG. 9 schematically depicts a technique according to some embodiments for observing network traffic and collecting observations that may be used to infer a relationship between two entities, where the observations may include port numbers and flow information associated with network flows.

FIG. 9 demonstrates the observation of individual data points used in this third technique. In this context, a device connected to the network of one organization communicates with systems at another organization, where those communications are routed across the Internet and pass through one or more network operators along the way. With reference to FIG. 9, the actions of the device begin at "A1," when a user utilizes a device to connect to a network provided, controlled, or used by "Example, Inc." This information can be known by associating the IP address allocated to the device to the organization known to provide, control, or use that IP address. Also at "A1," the user causes the user device to send a packet ultimately destined for a system owned, controlled, and/or used by "Business Partner, LLC."

In the first set of transactions, that destination is ultimately the network systems operated, controlled, and/or used by "Business Partner, LLC." The packet that was sent from the user device is routed across the Internet, typically through various other network operators and transit providers, as shown by the annotations "B1." One of these transit providers logs the traffic transiting through their network, as shown at "C1," where the logged traffic may include the transactions that the originating user device had sent.

Since routing on the Internet is not necessarily deterministic, it is possible that the route a packet ultimately took to "Business Partner, LLC" included the path indicated at "D1" and thus that packet bypassed the network operator who is saving flow information. It could also be the case that the packets sent to "Business Partner, LLC" go through "D1", but packets returning to "Example, Inc." may take the entire path as indicated by "B1" and thus "C1," as well. Packets are exchanged between the user device and the server before the connection is ultimately terminated by one of the two parties.

Figure 10:
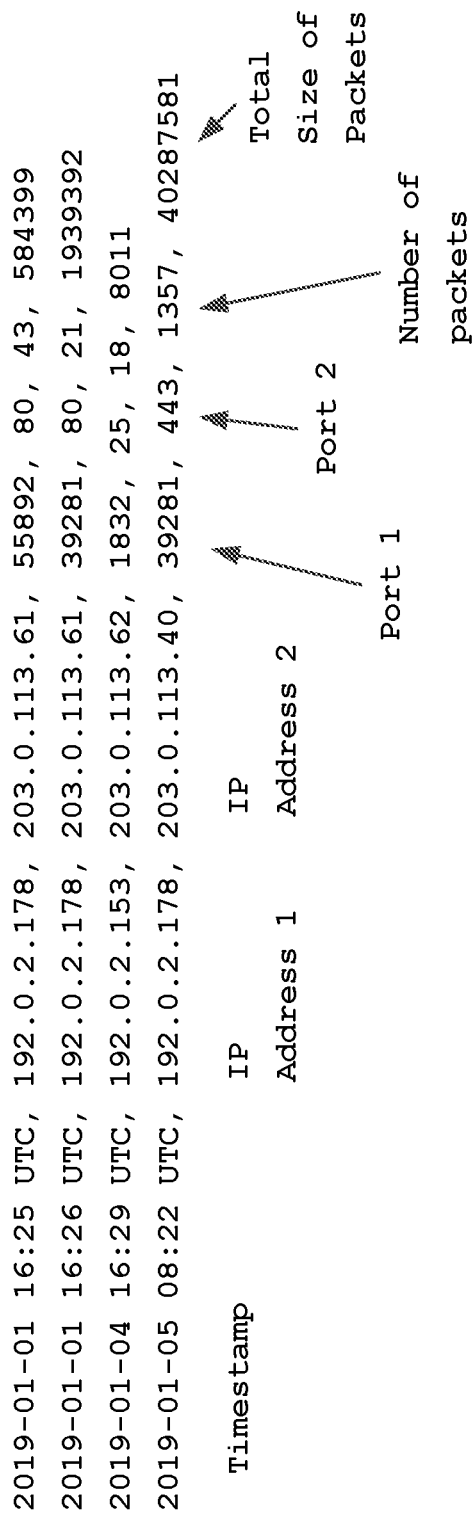
FIG. 10 depicts example data points observed and collected using the technique described with reference to FIG. 9.

In addition to communicating with the web system at "Business Partner, LLC," the same user device at "Example, Inc." and/or other user devices at "Example, Inc." may communicate with the MTA by sending an email, as shown at "F1", or send or receive a file using the on-premise solution at "Business Partner, LLC," as indicated by "G1." Each of these transactions, if routed entirely through "B1" may be logged as indicated at "C1." The producer of the flow information may perform summary of the packets, or produce data points for each packet sent, as shown in FIG. 10. Each data point includes the fields: TimeStamp, IP address 1, IP address 2, Port 1, Port 2, Number of packets, and Total size of packets.

There exist many different protocols for which traffic can be observed, each serving distinct functions. While more and more higher-level application commonly use HTTP as the preferred method of transacting, there are still many services and applications that use other standard protocols that can provide visibility into the activity of certain devices on different networks. This differentiation and understanding of those services can be important given that the use of certain protocols (e.g. collaboration protocols like SMTP or XMPP, etc.) may imply greater evidence of a business relationship than others (e.g., the generic HTTP protocol. Some protocols exhibit certain patterns in flow information (e.g. common programmatic transactions may exhibit distinct or similar payloads or packets exchanged, from which the type of action that the device or user is performing can be inferred. Which particular protocol(s) is/are being used when the devices associated with one entity engage in transactions with another entity can be inferred from the port number(s) at the other entity that are accessed. Alternatively, or in addition, the protocol(s) can be identified by analyzing the flow information.

Another source of added-value for the inferencing system that analyzes this dataset includes data describing the context around individual IP addresses, where the context can be a factor in analyzing the existence of or nature of business relationships. For example, if a user interacts with an organization's primary website (e.g., "www.example.com"), hosted, for example, at IP address 192.0.2.203, with an arbitrary number of packets and volume exchanged, this data point alone may not specifically reveal a business relationship unless one understands the supported functions of the primary website. If those functions do not contain functions or information that a business partner may need to access, there may not be a strong evidence that this transaction represents a dependency or a relationship between the user's and the visited organizations.

The data set may include another IP address, e.g., 192.0.2.210, involved in one or more transactions with the user or user device associated with an entity. Contextual information about this other IP address, that may be unrelated to flow information, may reveal that this particular IP address exclusively hosts a web application tailored towards information exchange of that business's clients. This may be an important piece of information that provides strong evidence of a dependency or a relationship between the user's and the visited organizations. Other factors include frequency of visits, adjusted for the size of the originator's organization, so as to avoid a skew due to an organization having a large number of employees.

While FIG. 9 depicts an example of a workstation at "Example, Inc." communicating with a server at "Business Partner, LLC," there is no significance or limitation on the types of devices that may be communicating in the context of this technique. For example, two servers may communicate with each other, two workstations may communicate with each other, either or both communicating devices may be mobile devices, one system/device may communicate with many other systems/devices simultaneously, etc. An inferencing system ingesting the data points having flow information may determine whether a communicating system/device is a workstation, a mobile device, or a server, to provide additional contextual information, e.g., information that may help identify the specific kind(s) of services provided at an IP address and/or a port.

Technique 4: Inferencing Based on Entity Identifiers

The fourth technique that a system identifying possible business relationships is based on the assumption and observation that users or devices, may have an implicit or explicit relationship or dependency with the organizations for which they are exchanging email as revealed by anti-spam and reputation technologies in services within the path of the email exchange. This technique uses data points containing information about the two organizations, such as described by either the IP addresses of the endpoint systems who are sending or receiving email, the MTAs who are processing email being sent or received, as well as the domains that are associated with the email accounts involved in the transaction.

Each data point in the data set required for this technique generally includes a timestamp which may be the point in time at which a transaction generating the data point is received by a downstream system, an identifier of one organization (domain component of an email address, IP address of the MTA, IP address of a DNS resolver, or IP address of the endpoint, etc.) and an identifier of another organization (domain component of an email address, IP address of the MTA, IP address of a DNS resolver, or IP address of the endpoint, etc.). The types of the two entity identifiers included in a data point can be but need not be the same. For example, the IP address of the MTA may be representative for one organization and a domain present may be representative for the other organization. Likewise, there may be multiple identifiers for one organization or the other, or both, within each one of the data points.

The combination of multiple types of attributes can be helpful when one or both of the organizations use an email service provider or third-party/external services firm to manage their email infrastructure. Under these conditions, the IP address of the respective MTAs would likely appear associated with the email service provider rather than the originating or destination organization. A reliable attribute would then be domain-level information as that is exclusive to each organization, unless they also happen to be using a generic email hosting provider, which is more common in small businesses. As such, the IP address of the endpoint, workstation, user device that sent or received the mail is likely a source of data leading to an accurate determination of the existent and/or nature of a relationship.

The data points used in this technique generally do not use RFC1918 IP addresses because such an IP address usually does not provide any notional value as a standalone attribute. An RFC1918 IP address may be provided alongside a publicly routed IP addresses where the RFC1918 IP address can provide value disambiguating between multiple clients behind a NAT. The IP address may be the form of an IPv4 address or an IPv6 address. An IPv6 address may allow for noise reduction if the device is connected to multiple networks that use SLAAC and embed the device's MAC address into the IPv6 address. However, unlike networks consisting of workstations, the IP addresses of MTAs are expected to remain very stable considering administrators often rely upon reputation of their previous activities to ensure reliable deliverability in the future.

The transactions that would generate the data points used by this technique typically occur in the realm of anti-spam and domain and IP reputation services. Operators of email infrastructure systems are incentivized to use a number of different opportunities and methods in order to reduce the amount of noisy email, or those that would be classified as spam, from being delivered to their end-users. As such they often employ various techniques during the entire email exchange lifecycle to obtain the probability that a given email that is in the process of being received is malicious or spam.

These transactions can occur at any point during the delivery process. Often, they are initiated by the MTAs owned and operated by the destination domain owner, or by the device or system of the end-user, or more specifically by the operator of the destination mailbox. The objective of these transactions is to gather as much external contextual information about the sender as possible, and as such, these technologies often employ investigating the domain associated with the sender's email address, investigating the entire mailbox associated with the sender's email address, investigating the IP address of the system connecting to the MTA(s) performing this investigation, investigating the content of the email address itself, etc.

During the course of programmatically discovering information about email addresses, domains, or IP addresses of the sender's system, the receiving MTA may provide certain information about itself to third-party reputation services or other systems. From this information, it is inferred in some embodiments that the entity associated with the MTA may have a business relationship with the entity associated with the sender of the email. As such, data points used in this technique may be generated by a reputation service and/or another system interacting with the reputation service, using the information received from the MTA or from another requestor requesting investigation of the email sender. For example, if a service is providing both domain and IP address reputation, a receiving MTA may be interested in querying the service for all inbound mail it is receiving. As such, it is providing this service with: (a) the domain being queried, which is the domain component of the sender's email address, i.e. the domain of the sender, (b) the IP address being queried, which is the IP address of the system sending the email, and (c) the IP address of the system receiving the email, or a proxy of that system that is performing the query. From this information, a business relationship can be inferred between the sender and the receiver entities. In some cases, such an inference may be drawn only when a certain threshold number of requests are observed.

These queries may be structured in many different ways and may include other contextual information from the exchange between the systems or from the email content or headers. The receiver system may use different channels to perform the quer(y/ies) depending on the implementation of the reputation service. For example, a query may be sent directly to the service via HTTP or some other protocol, or may be transmitted through another application. If the channel is DNS rather than direct HTTP transactions, the reputation information may be available beyond just the transactions. For example the reputation information may manifest within passive DNS feeds or other contexts where this information is public or shared (e.g. the reputation service may host a website detailing reputation of assets and the originating reports).

Figure 11:
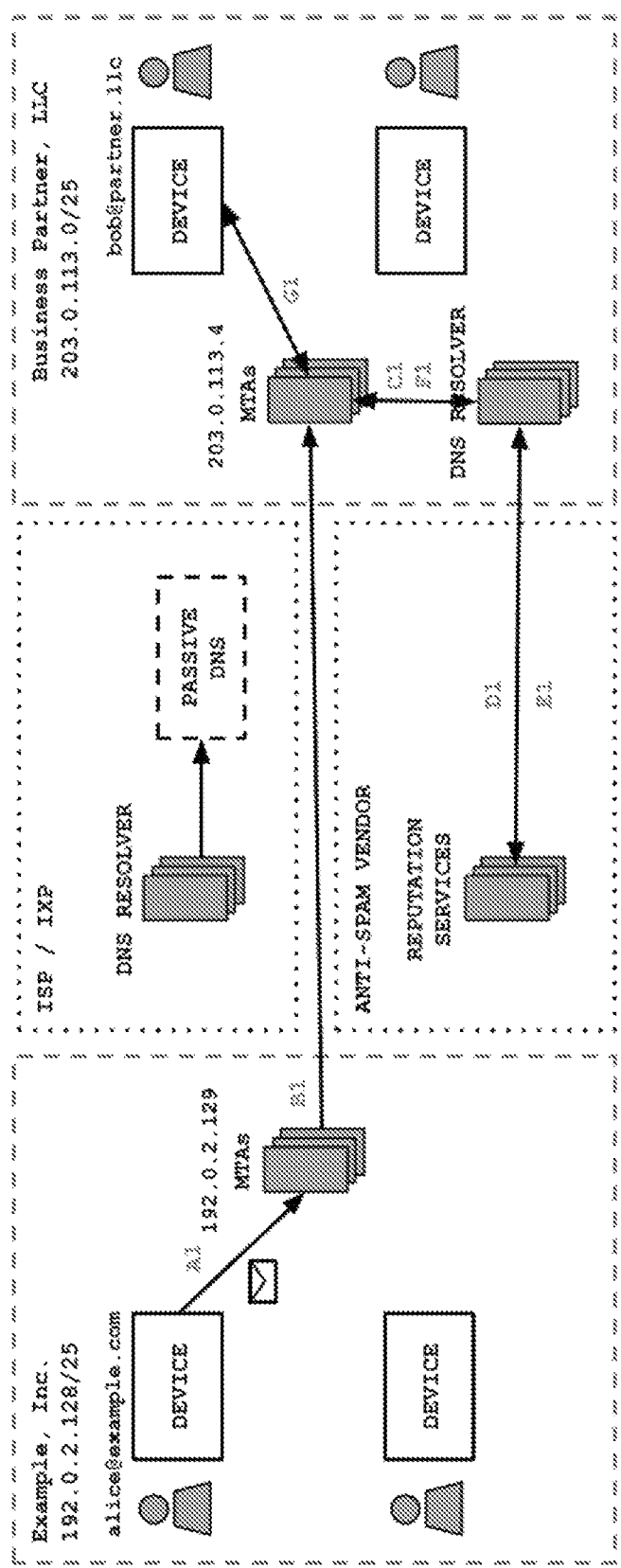
FIGS. 11-13 schematically depicts a technique according to some embodiments for observing network traffic and collecting observations that may be used to infer a relationship between two entities, where the observations may include requests to an responses from a reputation service.
Figure 12:
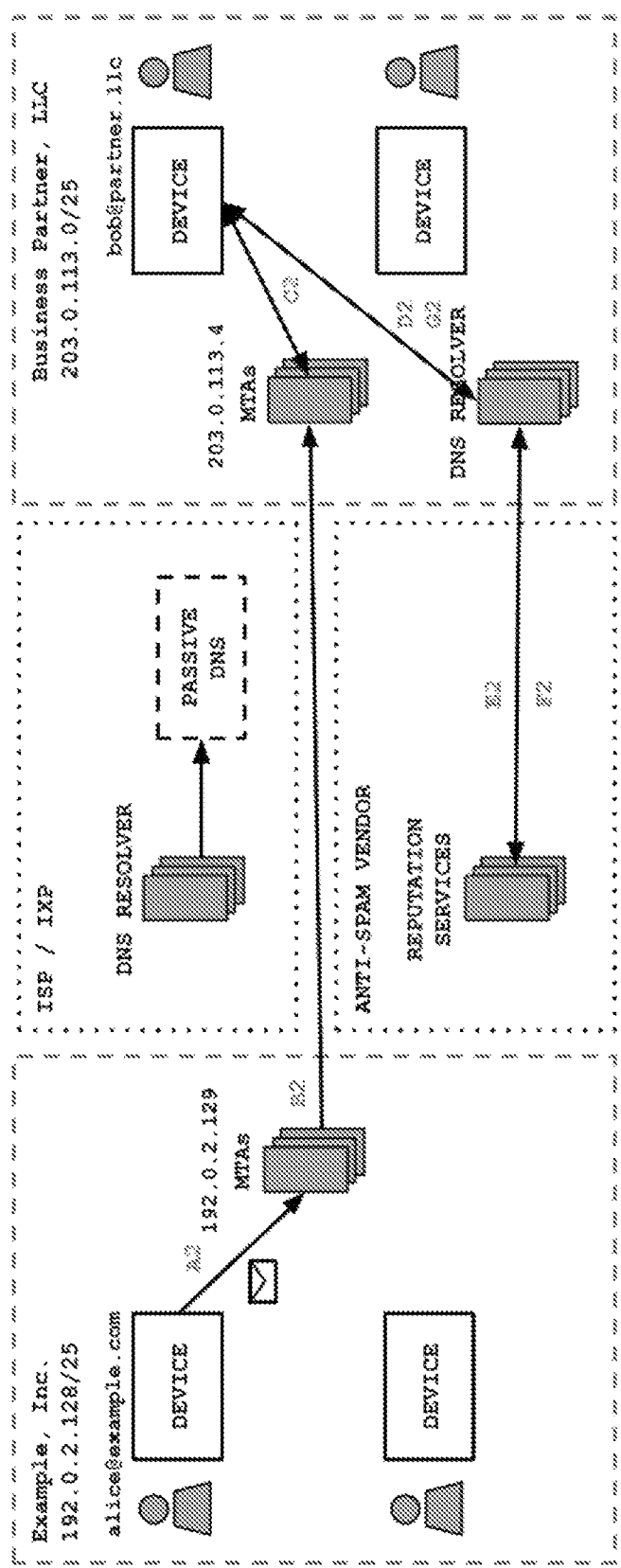
Figure 13:
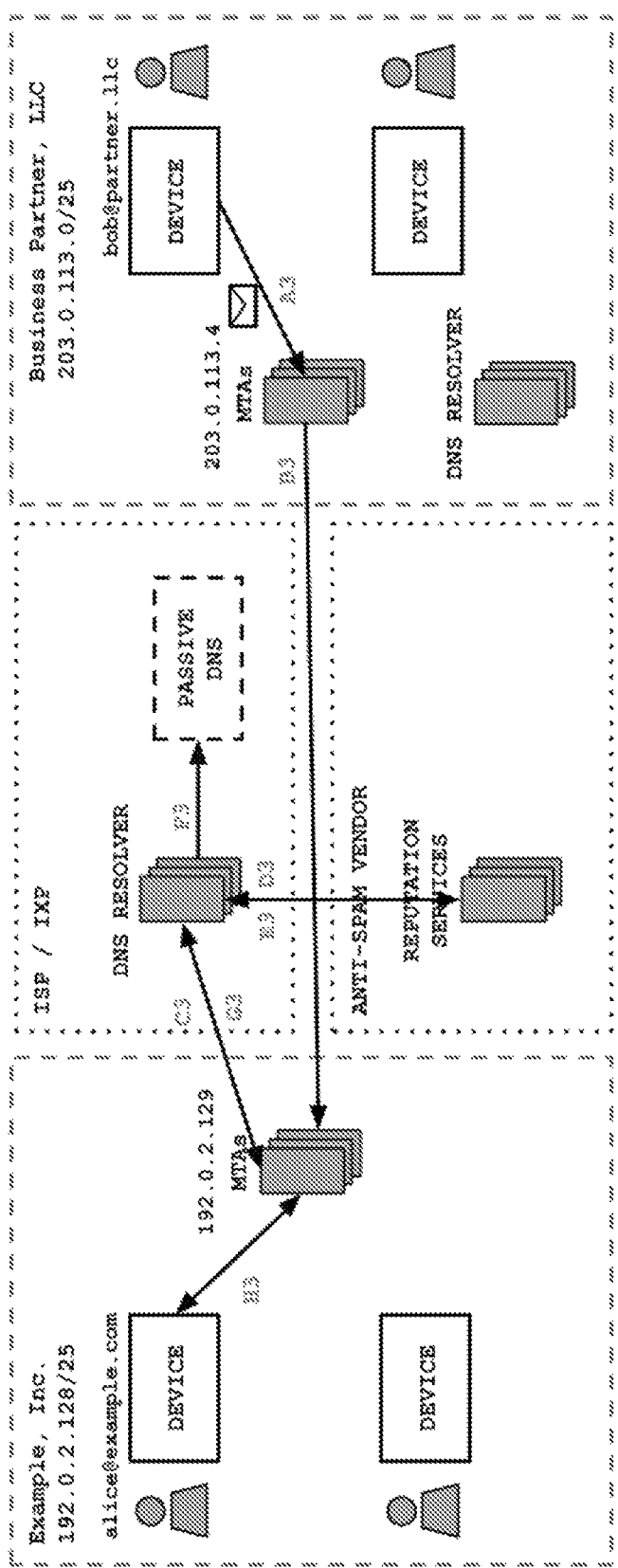

FIGS. 11-13 demonstrate a set of examples and different actors involved in the process, including those that may observe and provide the data points for this technique. With reference to FIG. 11, the process is initiated when alice@example.com sends an email ultimately destined for bob@partner.llc at "A1." This email is sent through "Example, Inc.'"s MTA as configured on the device operated by Alice. In this example, "Example, Inc." operates their own MTA on-premise and has the IP address 192.0.2.129. At "B1" the MTA forwards this email along to the MTA operated by "Business Partner, LLC." It is during this stage that the receiver MTA may perform an investigation into the MTA that sent the email. Depending on the sophistication and configuration of the anti-spam mechanisms on "Business Partner, LLC," the checks it performs can vary considerably, and may be more aggressive with respect to the sender systems from which the receiver MTA has never received any mail before. Alternatively after many exchanges, a receiver MTA may ultimately consider "Example, Inc.'"s MTA a trusted resource and perform few, if any, checks on the system.

The receiver MTA may begin by constructing a query that investigates both the domain and IP address of the sender. This query may be formed as part of a single DNS query name and the query name may be suffixed with the one specified to be used by a particular anti-spam vendor. A suffix may be a function of the reputation service's API design. For example, if the reputation data can be queried via a DNS, the service may dictate that queries all take the form: <ip address>.<domain> with the service's domain name (e.g., "service-domain-name.com") suffixed at the end. To illustrate, the domain "example.com" and the IP address "198.3.5.53" may be queried using the DNS query name "198.3.5.53.example.com.service-domain-name.com." The receiver MTA forwards this query to the company's DNS resolver ("C1") where it is queried throughout the DNS hierarchy before ultimately being sent to the anti-spam vendor's DNS authoritative name servers ("D1") where the request is routed to the anti-spam vendor's internal service.

Once a reply is determined, it is sent back to the DNS resolver ("E1"), which is then replied back to the MTA operated by "Business Partner, LLC" ("F1"). Using input received from this anti-spam vendor, among many other possible interfaces and data sources, the MTA can pass that information into an internal model and filter to determine what action it may take on this individual email. Considering this is a legitimate business exchange, the MTA may pass the email message onto the recipient ("G1") and into the recipient's mailbox.

In this example the MTA was the actor that initiated the interface with the anti-spam vendor, but any party in the path of the email exchange may interact with this vendor, either by a human initiated action or a programmatic one, as FIG. 12 illustrates. FIG. 12 shows similar operations as those shown in FIG. 11 for the first two stages, "A2", and "B2." Thereafter, the order of events differs. In this example, when the MTA receives the email as part of "B2," it still may perform various reputation checks and/or may apply other anti-spam techniques. The MTA may come to the conclusion that the received email passes the applied verification steps and would deliver the email to the inbox of the recipient ("C2").

The recipient may have its own anti-spam component on its local system. This is common within various anti-virus applications, that might also analyze the email origin and attachments within those emails. It is at this stage that the recipient user's system initiates the transaction with the DNS resolver to request reputation information ("D2"), possibly among other actions. Similar to the transactions in FIG. 11, the request is forwarded to the vendor ("E2"), a response is returned ("F2"), and then returned to the user ("G2"). The application may take further action based on the response.

The difference between these two scenarios can impact the characteristics of the queries and the volume observed for a given destination email domain. For example, when the receiving MTA performs anti-spam validation on all inbound mail to the organization for every mailbox, that generally affects more individual users than a single individual user performing it for his or her own mailbox. In both of these instances, the reputation and anti-spam vendors understand the context for which the data is being queried as well as the actors being queried and potentially where the query is originating. There can be other cases where other parties are aware of the frequency of reputation lookups on systems, including the actors being queried, as described below.

With reference to FIG. 13, "bob@partner.llc" at "Business Partner, LLC" sends an email destined to "alice@example.com" at "Example, Inc." Bob sends the email ("A3") to his MTA to be forwarded through the rest of the Internet. The sending MTA ultimately sends the email to the receiver MTA at "Example, Inc." ("B3"), and the receiving MTA begins to perform anti-spam processes on that received mail. In this example, that process involves communicating with an external anti-spam vendor through the vendor's DNS interface ("C3") to perform a reputation check on the sending MTA.

The DNS resolver forwards this query to the anti-spam vendor ("D3") and receives a response back based on the information included in the query ("E3"). Unlike the previous examples, the DNS resolver that "Example, Inc." uses retains the queries and answers thereto as part of a DNS record retention or passive DNS platform. After it receives the answer back from the anti-spam vendor, it outputs this record to the passive DNS platform ("F3"). In some cases, the information stored in the passive DNS may be used to infer a business relationship, e.g., between Example, Inc. and Business Partner, LLC. The DNS resolver subsequently or simultaneously sends this record back to the receiving MTA ("G3"), which then passes this information onto the recipient's mailbox after determining that it is not malicious.

The recipient user is then able to access the email, e.g., when the next time the user or a programmatic system checks the status of the mailbox ("H3").

Technique 5: Inferencing Based on IP Address Geolocation Association

The fifth technique that a system identifying possible business relationships is based on the assumption and observation that users or devices, may have an implicit or explicit relationship or dependency with the organizations when the users or their devices are physically at another organization's office or other space used by that organization. It uses data points containing information about the two organizations, such as described by either the IP addresses of the endpoint system and or a device or user identifier, as well as the positioning information of the device.

Each data point in the data set required for this method generally includes a timestamp which may be the point in time at which a transaction generating the data point is received by a downstream system, an IP address of the device or an identifier of the user or device, as well as the physical location of the device. In the case when an IP address is absent from the dataset and a device identifier is present, multiple observations may be necessary to understand the context of the device and the organizations with which the device is associated.

Figure 14:
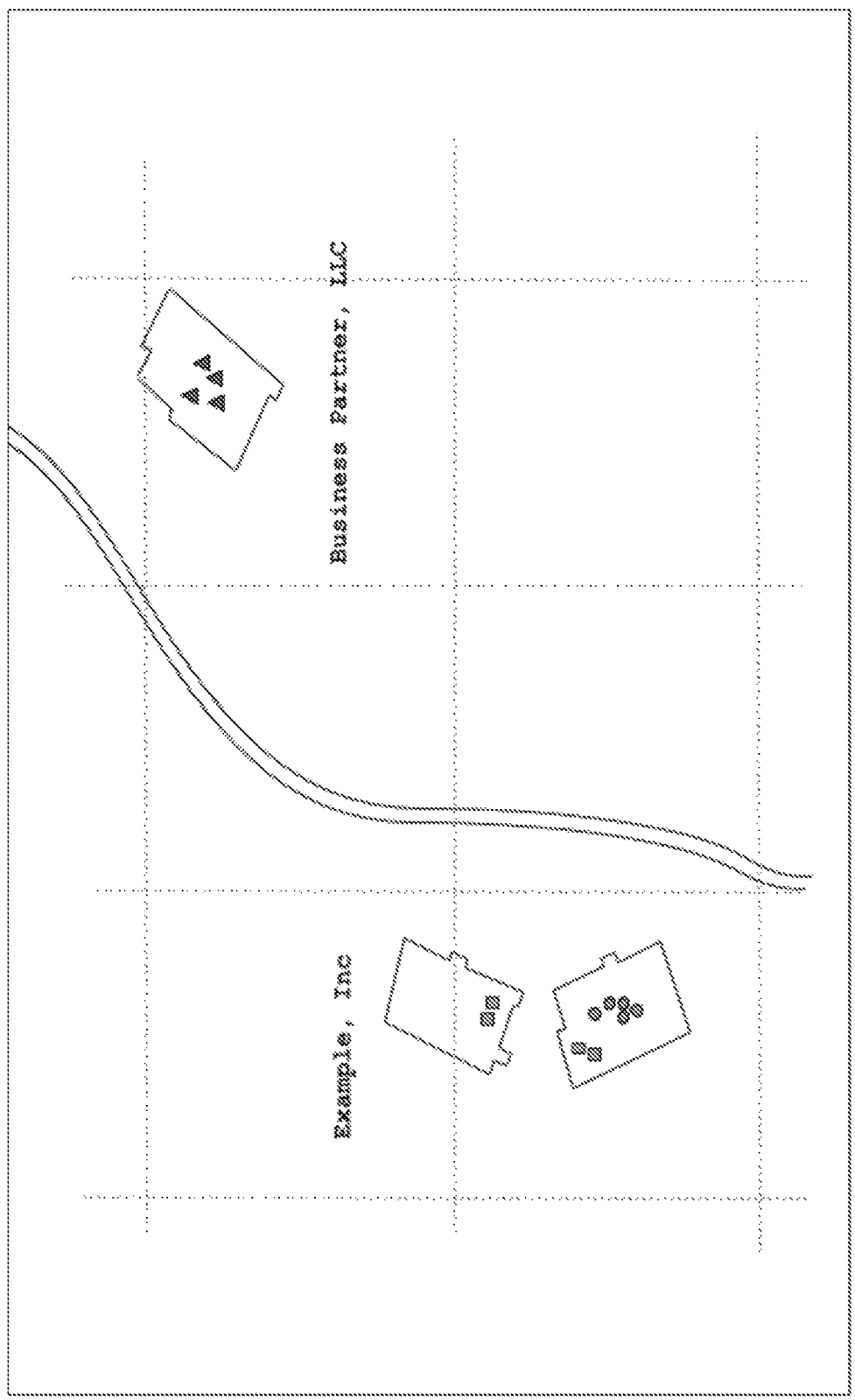
FIG. 14 schematically depicts a technique according to some embodiments for observing network traffic and collecting observations that may be used to infer a relationship between two entities, where the observations may include geolocation information associated with user devices.

With reference to FIG. 14, at a certain time, a particular device having a particular device ID may be observed to be present at locations associated with "Example, Inc." It may be observed optionally, that the observed user device is allocated an IP address that belongs to or is used by "Example, Inc." At another time, the same device may be observed to be present at a location associated with "Business Partner, LLC." It may be observed optionally, that the user device is allocated an IP address that belongs to or is used by "Business Partner, LLC."

At other instances of time, similar observations may be made with respect to other user devices or users. For example, a device may be observed at a location associated with "Business Partner, LLC" and a user identifier "user1@emailprovider.com" may be transmitted to an observer from the user device. At another time, a device may be observed at a location associated with "Example, Inc." It may or may not be known whether the same device that was previously observed at the location of "Business Partner, LLC" is now observed at the location of "Example, Inc." The same user identifier, "user1@emailprovider.com" may be transmitted, however, to the observer when the user device is a the location of "Business Partner, LLC."

From either sets of observations, i.e., those involving the device ID or the user ID, it may be inferred that a business relationship exists between "Example, Inc." and "Business Partner, LLC." The confidence in the inference can be improved by combining the two different types of data points.

There may exist other optional, value-added fields in one or more data points of the data set. An inferencing systems consuming this information can improve its accuracy by having both the device identifier and IP address available. Any of the known techniques to determine the current latitude and longitude data of the user device may be used. The contextual information on how the positioning information was derived, the precision, and/or positional error of that measurement can provide useful information about the quality of the data point. Information about the user device, or the type of device, can provide context on its expected behaviors and thus help eliminate or identify plausibly erroneous data points.

The data points used in this technique generally do not use RFC1918 IP addresses because such an IP address usually does not provide any notional value as a standalone attribute. An RFC1918 IP address may be provided alongside a publicly routed IP addresses where the RFC1918 IP address can provide value disambiguating between multiple clients behind a NAT. The IP address may be the form of an IPv4 address or an IPv6 address. An IPv6 address may allow for noise reduction if the device is connected to multiple networks that use SLAAC and embed the device's MAC address into the IPv6 address.

One may be able to derive additional device identifiers by observing user identifiers and vice versa. In general, this technique has no particular advantage when collecting data points from mobile devices versus from traditional workstations, or from laptops. There are, however, more instances of mobile devices in general, and it is more common for mobile devices to request and receive physical location information compared to other types of devices.

In some embodiments, only those data points that are mapped to a known physical address may be considered. Any information, not limited to only physical position or IP addresses, that is not associated with an entity may be ignored by the inferencing system analyzing those data points.

Analyzing Data Points

In various embodiments, an inferencing system can consume data points produced by any of the above-described techniques. The system may obtain knowledge of the source from which each data point originated. This may allow the inferencing system to use the semantics of data gathering to calculate more accurate duration and currency information. For example, if one data set having data points collected over a month was known to show evidence of relationships, while another data set having data points collected over an hour was also known to show evidence of relationships, the inferencing system may not apply the same rules to the two data sets when determining whether an relationship remains current or active. This may be largely enforced by a downstream process internal within this system that is processing all known evidence of relationships and then determines whether they remain valid. A ruleset to be applied to a particular data set and/or to data received from a particular source may be defined statically, when configuring the system, or the rulesets can be defined dynamically, e.g., by applying machine learning models on the data on a continuous basis, where labeled data are available and indicate known relationships.

Each data point has a form of validity before and beyond its creation date. For example, a data point produced by Technique 1 may be produced immediately after a device connects to the network, or hours or days after it does. In either situation, the device and/or the user were present in the physical space associated with the entity providing, controlling, or using the network to which the user device connected for an unknown amount of time before the data point was produced, and likely remained there for an unknown amount of time after the data point was produced. Thus, in each of the techniques described above, each data point is a discrete measurement conveying some continuous behavior that lasted for an unknown duration when considered in isolation.

Regardless, the relationship between organizations can still remain active in the above example even when the individual and the device departs from the physical location of the network. The expected re-observation period generally varies by technique, but it may also vary based on how the data points were produced by the observing entity (e.g. a provider may cause a device to report beacons once a minute, another may be once a day or less, etc.). In some cases, it is desirable that the re-observation period is neither too long, otherwise false positives can be introduced, nor too short, otherwise false negatives could appear. The re-observation period may also be a function of the entity size or other entity attributes. Thus, each data point has an extension of validity both before and after it was created. The lifetime of these data points can vary and it is up to the interpreter to understand what those may be.

Using relationships that are known to exist between two entities, the techniques described herein can allow an interpreter to understand how the inferencing may vary by data set, analysis techniques, and/or by provider of data sets. Size of organization, type of relationship, etc., among other differentiating factors may also be considered. This analysis may be performed on an on-going basis, e.g., to ensure that the system outputs results that at least include the known relationships. Likewise, false positives can be reduced by identifying behaviors in the techniques and datasets that lead to relationships being identified that are known not to exist.

Figure 15:
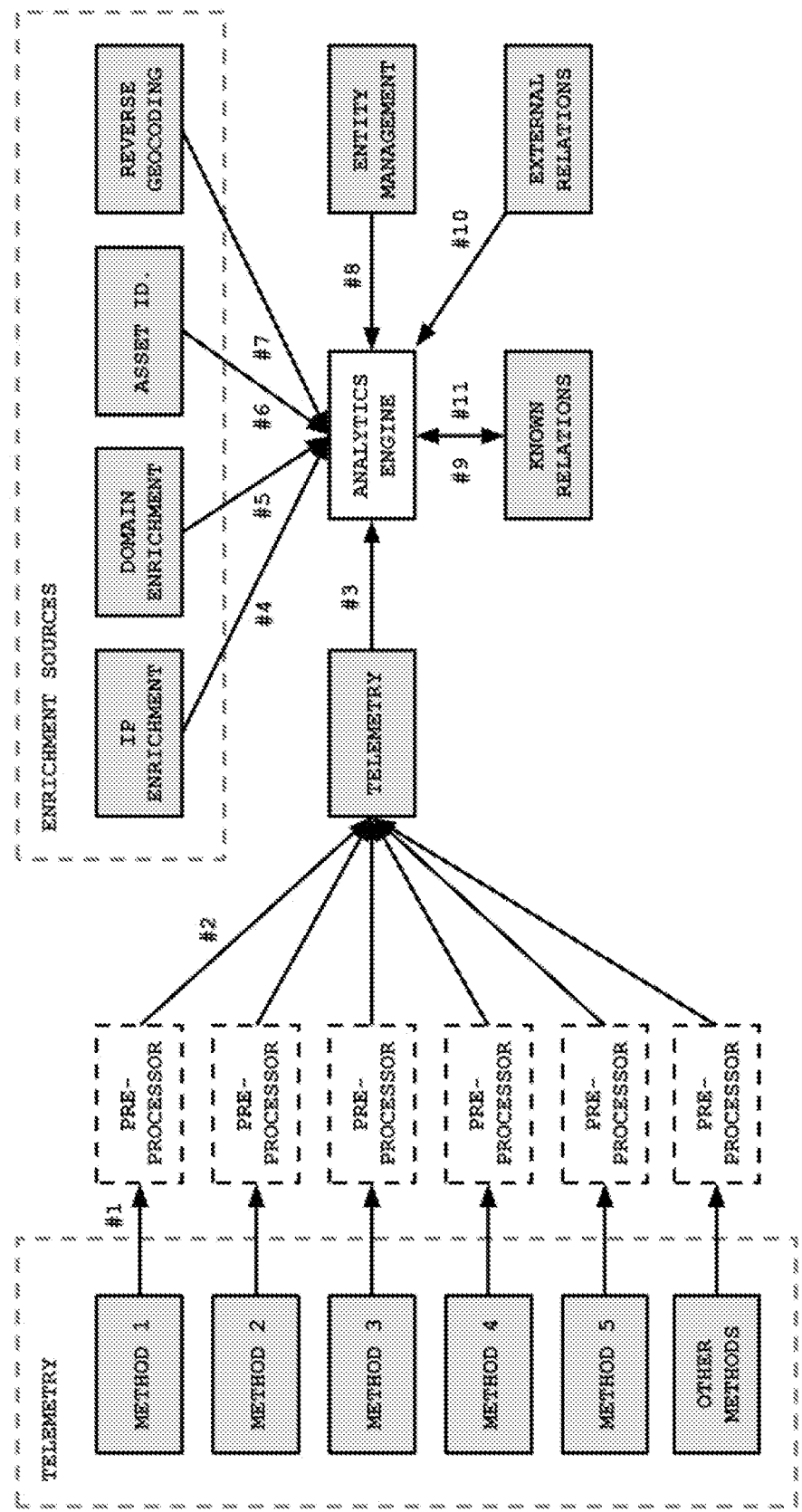
FIG. 15 schematically depicts an inferencing system according to some embodiments for inferring relationships between pairs of entities, using network data.

With reference to FIG. 15, in various embodiments, a relationship inferencing system performs various tasks in a number of stages. After each processing stage, the events may be written to a data store, messaging queue, or streamed directly to another process to perform the subsequent steps. All of these processes may be part of the same application that is responsible for ingesting data points and interpreting those results, or one or more processes may be provided as a distinct application, one or more of which may be executed using different physical computing systems.

The first stage involves processing the actual data points to analyze their meaning and optionally map the data points to a common form (#1). For example, each data set may not be delivered to the inferencing system in the same form/format or schema. One data set may be encoded as a CSV, another may be JSON objects, another may be a byte stream. The inferencing system may ingest and interpret these different forms of data sets using suitable parsers and/or interpreters.

The data may be de-duplicated to reduce the number of data points consumed in subsequent processing. A summary of the deduplication information may be embedded into a single event. For example, in the case of a data points originating from a data set produced according to technique 1, there may have been many data points produced by a specific device in a given transaction. These data points may be reduced down to a single data point with the count of data points and a range of timestamps for which that data point was observed. The dataset may then be written into an intermediate form into an arbitrary destination (#2).

Care is taken when performing deduplication, as the time series for which deduplication is performed may be too large, and loss of valuable information may occur. For example, in the case of a dataset produced according to Technique 1, if a device was on a network a specific point in time, transitioned to another network, and then returned to the first network, then the first and third event may not be deduplicated unless the system is able to retain the two distinct states within a combined event resulting from the deduplication.

The next stage (#3) is that once the system understands the data point, it may then enrich the data points with as much other information that is available or accessible to the system. If the inferencing system decides to retain a particular data point as evidence of a relationship, or decides to transform that data point into information that describes an inferred relationship, the system may optionally store this information with the data point. This can include, but is not limited to the following.

Enriching IP addresses to include network characteristic information (#4), such as but not limited to, classification of the IP address, whether it be residential, cellular, or other form that is relevant; known and associated wireless access points, which may be indicative of whether that specific IP address is known to be hosting a guest network, either shared or exclusive; known activity on that IP address; etc.

Enriching domains (#5) to include the company that is responsible for that asset at the time the data point was created.

Enriching IP addresses with current or historical devices associated with that network (#6), whether they are endpoint-machines like workstations or mobile phones or infrastructure providing services, etc.

Enriching IP addresses to include known physical location information associated with the IP address (#7) if the data point lacked that information, whether it is a standard geolocation conversion to a country, state, city, neighborhood or if it is to associated precision location information. This also includes translating precision location information into a set of plausible street addresses. This can be done using many services not described herein. These street addresses may then be joined against a repository of known street addresses belonging to various businesses.

Enriching IP addresses to include the company that is responsible for that asset at the time of the data point was created (#8), as specified by the timestamp of the data point. This is necessary to ultimately create a relationship between one company and another organization. This is also important to understand as a company uses many different IP addresses, so in some respects it can be thought as a deduplication effort. For example, if an organization owns and operates two different IP addresses, a data point associated with one IP address and a data point associated with the second data point can be treated as being associated to the same entity. This is particularly important when considering lifetime and durations of relationships, since it should not be expected to re-observe a relationship to the same individual type of evidence that was used to originally create the relationship.

Data points may also be considered time series of data points in the same data set or set of known relations (#9), or data points derived from different data sets outside of those processed by the system (#10). Each example provided above showed data points as represented as a time series. When looking at a single data point, it will generally provide value knowing what has preceded it. As such, part of the enrichment may include looking at other data points associated with one or more fields of the data points that is being assessed. For example, it may be beneficial to have all other data points associated with the IP address on hand when analyzing the current data point that is associated with that IP address and that is being processed.

The third stage is to determine if there is any value in the data point that is being received ("Analytics Engine"). A data point may be erroneous outright, for example due to requirements in the precision of the information received such as the data points generated according to Technique 5 that processes geographic data points, one would not want to consume (i.e., process or analyze) data points that have a large horizontal positioning error. Likewise, as discussed in each section about each method, there may be certain requirements that are desired, or a certain amount of confirmation that is necessary before the system should conclude that a relationship is current given a certain threshold of false positives.

A data point may be deemed to be erroneous but can also still provide value. For example, if a relationship is known to exist between two companies due to a series of previously processed data points, a data point that still proves this relationship is current, but has been deemed to have a higher margin of error, may still be useful to affirm that the relationship is current. As such, there may exist different levels of tolerance for errors, inaccuracies, attributes of false positives, or other function, that would deem a data point to be more reliable based on the task at hand, such as using the data point to: (i) reveal that a new relationship is present, (ii) re-enforce an existing relationship, or (iii) terminate a known relationship.

The fourth stage includes writing that information back into a respective datastore (#11), which can be a messaging queue or a formalized database or a traditional file store, depending on the requirements of any application interested in consuming information produced by such a system.

This system may simply output evidence (e.g. relationships between two IP addresses), and leave it up to another process to read all events, a portion of events (such as those still considered to be relevant for today versus when they were created), and to conclude that the entities associated with the two IP addresses, where the entities may be identified, e.g., by mapping the IP addresses to entities, have a relationship.

These steps describe how an inferencing system can process existing data. A part of the system may also process historical evidence of relationships to determine whether any previously inferred relationships remain active. This function may be left up to the consumers of the data, e.g., based on the tolerance for false positives. Entities generally vary in number of employees, number of active devices, and many other characteristics that can cause different entities to be represented differently in each of the data sets derived from the different techniques described herein. As such, a downstream consumer of relationships that has a higher tolerance for false positives may want to consume relationships that are known to exhibit features that indicate a higher likelihood of being a false positive (e.g., the relationship was not re-observed in any dataset, or the threshold for which a relationship could be conclusive has not been reached).

If an entity asset (such as, but not limited to, IP address, domain name, etc.) is not known at the time when processing a data point, but in the future it is understood that the ownership of that asset covered the period of time that the data point was produced, then it would be valuable to infer any relationships involving that entity in the future. It may be the case that one of the two owners are not known, or perhaps both of the owners are not known. As such, one way to embed relationship information is by its evidence such that a downstream consumer of these data points can process the current and historical data points to know which of the entities were/are associated with each other.

The inference of business relationships may be used directly, e.g. to assess the strength of cybersecurity of an entity in the context of its partners. Other indirect uses of the inferences include determining the quality of data sets indicative of such relationships. For example, if through the aforementioned techniques a relationship was identified between a company and a local airport, e.g., based on employees of the company traveling through that airport, this is an inference that can be used directly. However, if this relationship ceases to exist or is significantly diminished over a period of time, while the volume of the company employees at another airport significantly increases, and no other public information is known about this company, then it may be reasonable to assume that the observed company has moved its office to a different location. In this case, other data sets may not have been updated to demonstrate the change in the physical office of the observed company.

Some uses of these techniques permit a higher tolerance for false positives. For example, when recommending a vendor to be added to a portfolio of companies for the purposes of monitoring the security posture of the companies in the portfolio, such a recommendation engine has a notable tolerance for false positives, although it cannot be too high or else the user interested in the security profile may not find substantial value from such an inference. On the other hand, if an organization's security posture is understood to be a function of its relationships, then the tolerance for false positives may be minimal to non-existent, as one would not want an erroneous false positive causing an inaccurate representation of that organization's security posture.

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

A computing system used to implement various embodiments may include general-purpose computers, vector-based processors, graphics processing units (GPUs), network appliances, mobile devices, or other electronic systems capable of receiving network data and performing computations. A computing system in general includes one or more processors, one or more memory modules, one or more storage devices, and one or more input/output devices that may be interconnected, for example, using a system bus. The processors are capable of processing instructions stored in a memory module and/or a storage device for execution thereof. The processor can be a single-threaded or a multi-threaded processor. The memory modules may include volatile and/or non-volatile memory units.

The storage device(s) are capable of providing mass storage for the computing system, and may include a non-transitory computer-readable medium, a hard disk device, an optical disk device, a solid-date drive, a flash drive, or some other large capacity storage devices. For example, the storage device may store long-term data (e.g., one or more data sets or databases, file system data, etc.). The storage device may be implemented in a distributed way over a network, such as a server farm or a set of widely distributed servers, or may be implemented in a single computing device.

The input/output device(s) facilitate input/output operations for the computing system and may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices. In some examples, mobile computing devices, mobile communication devices, and other devices may be used as computing devices.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium.

Various embodiments and functional operations and processes described herein may be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein is for the purpose of description and should not be regarded as limiting. The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A method for inferring a relationship between two entities, the method comprising the steps of:

receiving at a server a network observation dataset, each data point in the dataset comprising (a) a device identifier, and (b) (i) a network address or (b) (ii) a device location;

selecting from the dataset a first-type data point comprising: (A) a first device identifier, and (B)(i) a first network address or (B)(ii) a first device location;

identifying a first entity associated with the first network address or the first device location;

selecting from the dataset a second-type data point comprising: (A) the first device identifier, and (C)(i) a second network address different from the first network address or (C)(ii) a second device location different from the first device location;

identifying a second entity that is different from the first entity and that is associated with the second network address or the second device location;

inferring, at a baseline confidence level, a relationship between the first entity and the second entity;

determining that: a total number or frequency of the first-type data points in the dataset is at least equal to a specified home-count or home-frequency threshold; and determining that: a total number or frequency of the second-type data points in the dataset is at least equal to a specified visitor-count or visitor-frequency threshold.

2. The method of claim 1, wherein: the first network address comprises: a first Internet Protocol (IP) address, a first service set identifier (SSID), or a first basic SSID (BSSID); and the second network address comprises a second IP address, a second SSID, or a second BSSID.

3. The method of claim 1, further comprising:
selecting from the dataset a third-type data point comprising: (D) a second device identifier, and (C)(i) the second network address or (C)(ii) the second device location;
  selecting from the dataset a fourth-type data point comprising: (D) the second device identifier, and (B)(i) the first network address or (B)(ii) the first device location; and increasing the baseline confidence level.

4. The method of claim 1, further comprising:
increasing the baseline confidence level.

5. The method of claim 1, further comprising:
receiving an enrichment attribute; testing whether the enrichment attribute is associated with the first entity or the second entity; and
increasing the baseline confidence level, if the enrichment attribute is determined to be associated with the first entity or the second entity; and
otherwise, decreasing the baseline confidence level or invalidating the inferred relationship.

6. The method of claim 5, wherein:
the enrichment attribute comprises an entity identifier; and the testing step comprises determining whether the entity identifier identifies the first entity, the second entity, or a different third entity.

7. The method of claim 5, wherein:
the enrichment attribute comprises a service set identifier (SSID); and
testing step comprises determining whether the SSID is associated with the first network address or the second network address or neither the first nor the second network address.

8. The method of claim 5, wherein the enrichment attribute comprises a physical location associated with the first or the second network address.

9. The method of claim 5, wherein:
the enrichment attribute comprises a classification of the first or the second network address; and
the testing step comprises determining whether the classification indicates a business entity.

10. The method of claim 5, wherein:
the enrichment attribute comprises a list of Access Points (APs) associated with the first network address; and the testing step comprises determining whether one or more APs in the list are designated as non-guest APs.

11. The method of claim 5, wherein:
the enrichment attribute comprises a list of Access Points (APs) associated with the second network address; and the testing step comprises determining whether one or more APs in the list are designated as guest APs.

12. The method of claim 5, wherein:
the enrichment attribute comprises a list of devices associated with the first or the second network address and a respective type of each device; and the testing step comprises determining whether one or more devices in the list are endpoint devices.

13. The method of claim 5, wherein the first data point or the second data point comprises the enrichment attribute.

14. A system for inferring a relationship between two entities, comprising:
a processor;
a network port in communication with the processor and adapted to receive from a data source a network observation dataset, each data point in the dataset comprising one or more of: (i) a device identifier, (ii) a user identifier, (iii) a network address, or (iii) a device location; and
a memory coupled to the processor and comprising instructions, which when executed by the processor, program the processor to:
select from the dataset a first-type data point comprising: (A)(i) a first device identifier or (A)(ii) a first user identifier, and (B)(i) a first network address or (B)(ii) a first device location;
identify a first entity associated with the first network address or the first device location;
select from the dataset a second-type data point comprising: (A)(i) the first device identifier or (A)(ii) the first user identifier, and (C)(i) a second network address or (C)(ii) a second device location;
identify a second entity associated with the second network address or the second device location;
infer a relationship between the first entity and the second entity and designate to the inferred relationship a baseline confidence level;
determining that: a total number or frequency of the first-type data points in the dataset is at least equal to a specified home-count or home-frequency threshold; and
determining that: a total number or frequency of the second-type data points in the dataset is at least equal to a specified visitor-count or visitor-frequency threshold.

15. The system of claim 14, wherein:
the network port is adapted to receive an enrichment attribute; and the instructions further program the processor to: test whether the enrichment attribute is associated with the first entity or the second entity; and
increase the baseline confidence level, if the enrichment attribute is determined to be associated with the first entity or the second entity; and otherwise, decrease the baseline confidence level or invalidate the inferred relationship.

16. The system of claim 15, wherein the enrichment attribute comprises: (i) an entity identifier, (ii) a service set identifier (SSID), (iii) a physical location associated with the first or the second network address, (iv) a classification of the first or the second network address, (v) a list of Access Points (APs) associated with the first or the second network address and a respective type of each AP, or (vi) a list of devices associated with the first or the second network address and a respective type of each device.

17. The system of claim 15, wherein the first or the second data point comprises the enrichment attribute.

18. A method for inferring a relationship between two entities, the method comprising the steps of:
receiving at a server a network observation dataset, each data point in the dataset comprising a user identifier and a network address;
selecting from the dataset a first-type data point comprising a first user identifier and a first network address;
identifying a first entity associated with the first network address; selecting from the dataset a second-type data point comprising the first user identifier and a second network address different from the first network address; identifying a second entity that is different from the first entity and that is associated with the second network address;
inferring at a baseline confidence level a relationship between the first entity and the second entity;
determining that: a total number or frequency of the first-type data points in the dataset is at least equal to a specified home-count or home-frequency threshold; and
determining that: a total number or frequency of the second-type data points in the dataset is at least equal to a specified visitor-count or visitor-frequency threshold.

19. The method of claim 18, further comprising:
selecting from the dataset a third-type data point comprising a second user identifier and
the second network; selecting from the dataset a fourth-type data point comprising the second user identifier and the first network address; and
increasing the baseline confidence level.

20. The method of claim 18, further comprising:
increasing the baseline confidence level.

21. The method of claim 18, further comprising:
receiving an enrichment attribute; testing whether the enrichment attribute is associated with the first entity or the second entity; and
increasing the baseline confidence level, if the enrichment attribute is determined to be associated with the first entity or the second entity; and
otherwise, decreasing the baseline confidence level or invalidating the inferred relationship.

22. A system for inferring a relationship between two entities, comprising:
a processor;
a network port in communication with the processor and adapted to receive from a data source a network observation dataset, each data point in the dataset comprising a user identifier and a network address; and
a memory coupled to the processor and comprising instructions, which when executed by the processor, program the processor to:
select from the dataset a first-type data point comprising a first user identifier and a first network address;
identify a first entity associated with the first network address;
select from the dataset a second-type data point comprising the first user identifier and a second network address different from the first network address;
identify a second entity that is different from the first entity and that is associated with the second network address;
infer at a baseline confidence level a relationship between the first entity and the second entity;
determine that: a total number or frequency of the first-type data points in the dataset is at least equal to a specified home-count or home-frequency threshold; and
determine that: a total number or frequency of the second-type data points in the dataset is at least equal to a specified visitor-count or visitor-frequency threshold.

23. The system of claim 22, wherein the instructions further program the processor to:
select from the dataset a third-type data point comprising a second user identifier and the second network; select from the dataset a fourth-type data point comprising the second user identifier and the first network address; and increase the baseline confidence level.

24. The system of claim 22, wherein the instructions further program the processor to increase the baseline confidence level.

25. The system of claim 22, wherein the instructions further program the processor to:
receive an enrichment attribute;
test whether the enrichment attribute is associated with the first entity or the second entity; and
increase the baseline confidence level, if the enrichment attribute is determined to be associated with the first entity or the second entity; and
otherwise, decrease the baseline confidence level or invalidating the inferred relationship.

* * * * *